United States Patent
Osagawa et al.

(10) Patent No.: US 10,624,089 B2
(45) Date of Patent: Apr. 14, 2020

(54) NETWORK SYSTEM AND COMMUNICATION METHOD

(71) Applicant: Mitsubishi Electric Corporation, Chiyoda-ku (JP)

(72) Inventors: Daisuke Osagawa, Tokyo (JP); Atsushi Kajino, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/304,173

(22) PCT Filed: Nov. 14, 2016

(86) PCT No.: PCT/JP2016/083712
§ 371 (c)(1),
(2) Date: Nov. 23, 2018

(87) PCT Pub. No.: WO2018/087927
PCT Pub. Date: May 17, 2018

(65) Prior Publication Data
US 2019/0342886 A1      Nov. 7, 2019

(51) Int. Cl.
*H04W 72/04*      (2009.01)
*H04L 29/06*      (2006.01)
(Continued)

(52) U.S. Cl.
CPC ......... *H04W 72/0446* (2013.01); *H04L 67/12* (2013.01); *H04L 69/18* (2013.01); *H04W 56/0045* (2013.01)

(58) Field of Classification Search
None
See application file for complete search history.

(56) References Cited

U.S. PATENT DOCUMENTS 6,438,603 B1 *   8/2002   Ogus ............... H04L 47/10
                                                    370/238
6,483,846 B1 *  11/2002   Huang ............. H04L 12/417
                                                    370/445
(Continued)

FOREIGN PATENT DOCUMENTS

CN      102360206 A      2/2012
JP      10-257080 A      9/1998
(Continued)

OTHER PUBLICATIONS

International Search Report dated Jan. 31, 2017 in PCT/JP2016/083712, citing documents AA, AB and AJ-AL therein, 2 pages.
(Continued)

*Primary Examiner* — Eunsook Choi
(74) *Attorney, Agent, or Firm* — Oblon, McClelland, Maier & Neustadt, L.L.P.

(57) ABSTRACT

A network system constituted by a communication device performing communication of a first communication protocol for periodically transmitting data requiring low-delay transmission, a communication device performing communication of a second communication protocol for non-periodically transmitting data requiring low-delay transmission, and a communication device performing communication of a third communication protocol for transmitting data that does not require low-delay transmission, wherein a period in which transmission with the first protocol is permitted, a period in which transmission with the second protocol is permitted, and a period in which transmission with the third protocol is permitted are allocated, and each communication device transmits data in a period in which transmission with the protocol supported by the communication device is permitted, and transfers data received from another communication device in a period in
(Continued)

which transmission with a protocol supported by a data transmission source communication device is permitted.

18 Claims, 17 Drawing Sheets

(51) Int. Cl.
*H04L 29/08* (2006.01)
*H04W 56/00* (2009.01)

(56) References Cited

U.S. PATENT DOCUMENTS

| | | | |
|---|---|---|---|
| 6,813,282 B1 * | 11/2004 | Domon | H04L 12/40058 370/230 |
| 2002/0064157 A1 | 5/2002 | Krause | |
| 2005/0131852 A1 | 6/2005 | Berwanger et al. | |
| 2008/0002737 A1 * | 1/2008 | Schwenkel | G05B 19/042 370/463 |
| 2009/0034524 A1 | 2/2009 | Krause | |
| 2010/0232430 A1 | 9/2010 | De | |
| 2011/0064090 A1 | 3/2011 | Berwanger et al. | |
| 2016/0257536 A1 * | 9/2016 | Weiss | B66F 3/46 |
| 2017/0331748 A1 | 11/2017 | Mangin | |

FOREIGN PATENT DOCUMENTS

| | | |
|---|---|---|
| JP | 2001-94576 A | 4/2001 |
| JP | 2002-135278 A | 5/2002 |
| JP | 2002-520950 A | 7/2002 |
| JP | 2005-513959 A | 5/2005 |
| JP | 3854578 B2 | 12/2006 |
| JP | 2008-526059 A | 7/2008 |
| JP | 2017-532870 A | 11/2017 |

OTHER PUBLICATIONS

Japanese Office Action dated Mar. 2, 2018 in Patent Application No. 2017-560639 (with English translation), citing documents AJ-AL and AO therein, 6 pages.

Combined Taiwanese Office Action and Search Report dated Oct. 25, 2018 in Patent Application No. 106138774 (with English machine translation) citing documents AJ and AM therein, 20 pages.

* cited by examiner

NETWORK SYSTEM AND COMMUNICATION METHOD

FIELD

The present invention relates to a network system formed using a communication device relaying data used for control, a communication device, and a communication method.

BACKGROUND

The data used for control includes data periodically exchanged between a controlling device and a controlled device. The controlling device and the controlled device are connected to a communication device forming a network and exchange data via the network. There is also a configuration in which one or both of the controlling device and the controlled device include a circuit and the like corresponding to the communication device and are directly connected to the network. Transmission with a low delay is required for control data that is data used for control.

Patent Literature 1 discloses an inventive technique regarding a system for transmitting control data for an industrial machine. In the inventive technique disclosed in Patent Literature 1, a transmission cycle is set which is formed including a first range for performing data transmission for periodically made real-time communication, that is, real-time control and a second range for performing communication other than the periodically made real-time communication, so as to allow the real-time communication to be prevented from being affected by the other communication.

CITATION LIST

Patent Literature

Patent Literature 1: Japanese Patent No. 3854578

SUMMARY

Technical Problem

As described above, in the inventive technique disclosed in Patent Literature 1, settings are made such that a range for performing real-time communication which is periodically made and another range for performing the other communication which is not periodically made are determined. However, in the control data for the industrial machine, there is data which is not periodically transmitted and of which transmission time is uncertain. In other words, there is real-time communication whose time when it is made is undefined. Such control data of which the transmission time is uncertain is transmitted in the second range for performing non-real-time communication in the inventive technique disclosed in Patent Literature 1. For this reason, in the inventive technique disclosed in Patent Literature 1, the control data of which the transmission time is uncertain cannot be prevented from being affected by the other non-real-time communication, and there is a problem in that the data transmission may be delayed.

The present invention has been made in view of the above circumstances, and its object is to provide a network system capable of preventing an increase in transmission delay time of data.

Solution to Problem

In order to solve the above-mentioned problem and achieve the object, the present invention provides a network system constituted by a communication device to perform communication according to a first communication protocol under which data requiring low delay transmission is periodically transmitted, a communication device to perform communication according to a second communication protocol under which data requiring low delay transmission is non-periodically transmitted, and a communication device to perform communication according to a third communication protocol under which data that does not require low delay transmission is transmitted. In the network system, a period in which transmission with the first communication protocol is permitted, a period in which transmission with the second communication protocol is permitted, and a period in which transmission with the third communication protocol is permitted are allocated. Each of the communication devices transmits data in a period in which the transmission with the communication protocol supported by the communication device is permitted, and transfers data received from another communication device in a period in which transmission with a communication protocol supported by a communication device that is a data transmission source of the received data is permitted.

Advantageous Effects of Invention

According to a network system of the present invention, an advantageous effect is obtained such that an increase in transmission delay time of data can be prevented.

DESCRIPTION OF EMBODIMENTS

Hereinafter, a network system, a communication device, and a communication method according to the embodiments of the present invention will be described in detail with reference to the drawings. The present invention is not necessarily limited by the embodiments.

First Embodiment

Figure 1:
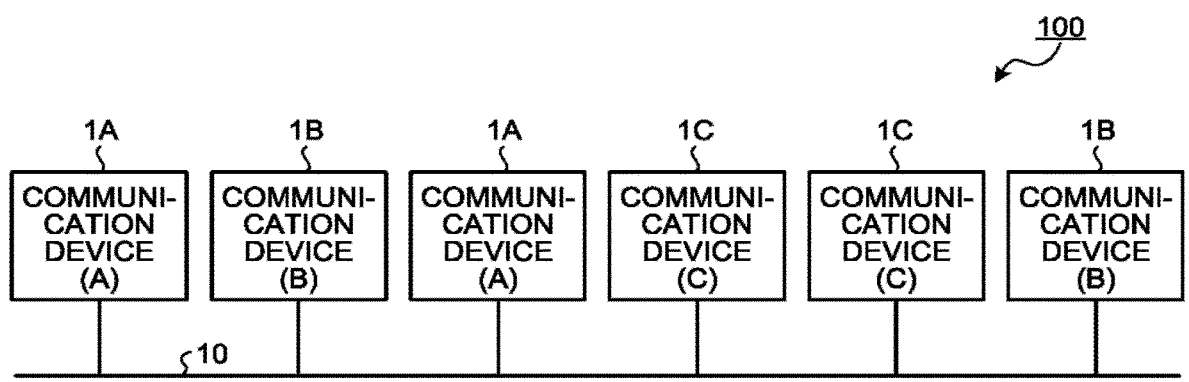
FIG. 1 is a diagram illustrating one example of a network system according to a first embodiment.

FIG. 1 is a diagram illustrating an example of a network system according to a first embodiment of the present invention. A network system 100 according to the first embodiment is constituted by a plurality of communication devices, and each communication device is connected to a communication line 10. The plurality of communication devices includes communication devices 1A, 1B, and 1C. The communication device 1A is a communicator device that performs communication by using a communication protocol A, the communication device 1B is a communicator device that performs communication by using a communication protocol B, and the communication device 1C is a communicator device that performs communication by using a communication protocol C. In the network system 100 illustrated in FIG. 1, the communication devices supporting the same communication protocol communicate with each other. The example illustrated in FIG. 1 in which two each of the communication devices 1A, 1B, and 1C are provided is merely an example. The number of communication devices supporting each communication protocol may be equal to or more than three. Furthermore, an order of the communication devices illustrated in FIG. 1 is an example. In the following description, there is sometimes a case where the communication devices 1A, 1B, and 1C are collectively referred to as a communication device 1.

Figure 2:
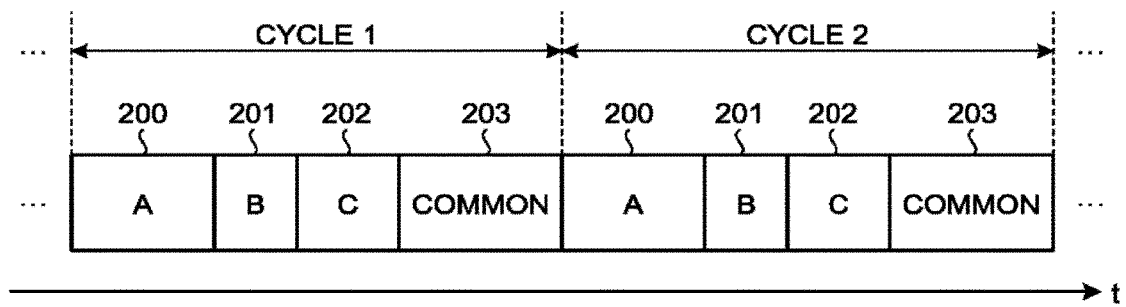
FIG. 2 is a diagram for explaining a communication operation of the network system according to the first embodiment.

FIG. 2 is a diagram for explaining a communication operation of the network system according to the first embodiment. In the network system 100, a transmission permission period which varies from communication protocol to communication protocol is defined in advance, and each communication device transmits data in a transmission permission period that is a period during which data transmission using a communication protocol supported by the communication device is permitted. In the example illustrated in FIG. 2, each of communication cycles such as a cycle 1 and a cycle 2 is formed including transmission permission periods 200, 201, 202, and 203. The transmission permission period 200 is a first period serving as a period during which data transmission using the communication protocol A is permitted. The transmission permission period 201 is a second period serving as a period during which data transmission using the communication protocol B is permitted. The transmission permission period 202 is a third period serving as a period during which data transmission using the communication protocol C is permitted. The transmission permission period 203 is a period during which data transmission using any of all the communication protocols is permitted without regard for the communication protocol. Hereinafter, the period in which the data transmission using any of all the communication protocols is permitted, such as the transmission permission period 203, is referred to as a common period. An arbitrary communication protocol includes the communication protocols A, B, and C, and includes other communication protocols.

In this way, in the network system according to the present embodiment, since the transmission permission period is different for each communication protocol, data transmission with a first communication protocol that is one of a number of communication protocols is not affected by data transmission with a second communication protocol that is another communication protocol. In the example illustrated in FIG. 2, in a case where the communication protocol A is a communication protocol for real-time communication which periodically occurs, that is, periodically made data communication for which a transmission delay time of data from a transmission-source communication device to a transmission-destination communication device is required to be equal to or less than a specified value, the data transmission with the communication protocol A is not affected by the data transmission with the communication protocols B and C. By virtue of this, it is possible to prevent an increase in the transmission delay time of the data transmission with the communication protocol A caused by an effect of the data transmission of the other communication protocol. In the following description, the data transmission for which the transmission delay time is required to be equal to or less than the specified value may be referred to as low-delay transmission. An increase in the transmission delay time of data such as control data, audio data, and video data may cause a problem in an operation of a device handling these kinds of data, and there is a case where the maximum value of the transmission delay time is specified in the communication protocol for transmitting these kinds of data. The data of which the maximum value of the transmission delay time is specified is "data requiring low-delay transmission". Furthermore, the data transmission, which non-periodically occurs, is not affected by the data transmission with the other communication protocol on a transmission path from the transmission-source communication device to the communication device which is a destination. Therefore, regarding the data transmission using the real-time communication which non-periodically occurs, it is possible to prevent increase in the transmission delay time caused by the effect of the data transmission with the other communication protocol.

Figure 3:
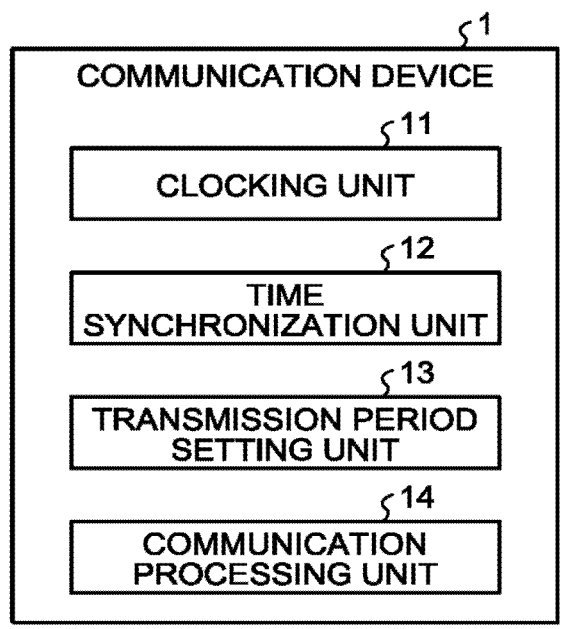
FIG. 3 is a diagram illustrating an exemplary configuration of a communication device according to the first embodiment.

FIG. 3 is a diagram illustrating an exemplary configuration of the communication device according to the first embodiment. The communication devices 1A, 1B, and 1C illustrated in FIG. 1 support their respective different communication protocols, but have similar device configurations.

The communication device 1 includes a clocking unit 11 which measures time, a time synchronization unit 12 which exchanges time information with the other communication devices 1 and adjusts the time measured by the clocking unit 11, a transmission period setting unit 13 which sets a period in which the data transmission is available with the communication protocol supported by the communication device, and a communication processing unit 14 which exchanges data with the other communication devices 1.

As described above, in the network system 100, each communication device 1 transmits data in the transmission permission period that is a period in which the data transmission with the communication protocol supported by the communication device 1 is permitted. To this end, each communication device 1 is equipped with the time synchronization unit 12, so as to adjust local time internally managed, that is, the time measured by the clocking unit 11 to synchronize the local time with time managed by the other communication device. Any existing method may be used as a method of adjusting the time by the time synchronization unit 12. The time synchronization unit 12 adjusts the time measured by the clocking unit 11 by using the Network Time Protocol (NTP), the Precision Time Protocol (PTP), or the like, and carries out time synchronization. In a case where the time synchronization is carried out using the PTP, the time synchronization unit 12 of each communication device 1 of the network system 100 acquires time information from a time master and adjusts the time measured by the clocking unit 11.

Furthermore, since it is necessary for each communication device 1 to beforehand recognize the transmission permission period in which the data transmission of the communication device 1 is permitted, each communication device 1 is equipped with the transmission period setting unit 13. The transmission period setting unit 13 acquires information on each transmission permission period in the network system 100 from an outside part. Examples of such an outside part include other communication devices and a device which is directly connected via a connector (not illustrated), that is, a device for inputting information on each transmission permission period and the like. When acquiring the information on each transmission permission period in the network system 100, the transmission period setting unit 13 sets the transmission permission period of each communication protocol to the communication processing unit 14. The communication processing unit 14 transmits data according to the transmission permission period set by the transmission period setting unit 13. Specifically, the communication processing unit 14 transmits data in the transmission permission period in which the data transmission with the protocol supported by the communication device 1 is permitted.

In a case where the transmission period setting unit 13 acquires the information on each transmission permission period from the other communication device 1, one of the communication devices 1 constituting the network system 100 operates as a distribution source of the information on each transmission permission period. In this case, the communication device 1 which serves as the distribution source is assumed to retain the information on each transmission permission period in advance. For example, in a case where the network system 100 is configured so that one of a number of communication devices 1 operates as a master and exchanges the control data with the other communication devices 1 which operate as slaves, it is considered that the master communication device 1 operates as the communication device 1 which is the distribution source mentioned above. The communication device 1 that is the distribution source monitors whether or not a new communication device 1 is connected to the network system 100, and when the device 1 detects the connection of the new communication device 1, the transmission period setting unit 13 transmits the information on each transmission permission period to a transmission period setting unit 13 of the newly connected communication device 1. This transmission of the information is performed in the transmission permission period 203 illustrated in FIG. 2, that is, the common period in which the data transmission with an arbitrary communication protocol is permitted. The information on each transmission permission period is, for example, information on a length of each transmission permission period, an order of the transmission permission periods, and a start time of any one of the transmission permission periods. Specifically, in a case where periods #1 to #3 are to be set as the transmission permission periods corresponding to the communication protocols A, B, and C, respectively, the information on each transmission period is supposed to include information on lengths of the periods #1, #2, and #3, an order of the periods, and information on a start time of the period #1. The number of transmission permission periods corresponding to the communication protocols may be two or more. For example, it is possible that the transmission permission period corresponding to the communication protocol A is assigned to the periods #1 and #3, the transmission permission period corresponding to the communication protocol B is assigned to the period #2, and the transmission permission period corresponding to the communication protocol C is assigned to a period #4. When the transmission period setting unit 13 of the newly connected communication device 1 receives the information on each transmission permission period, the transmission period setting unit 13 sets the transmission permission period of each communication protocol to the communication processing unit 14. In a case where the communication device 1 which is the distribution source of the information on each transmission permission period has detected that the new communication device 1 has been connected, the communication device 1 may transmit the information on each transmission permission period to all the communication devices 1 of the network system 100. Not only when the communication device 1 detects that the new communication device 1 is connected, but also regularly or irregularly the communication device 1 which is the distribution source of the information on each transmission permission period may transmit the information on each transmission permission period to all the communication devices 1 of the network system 100.

Figure 4:
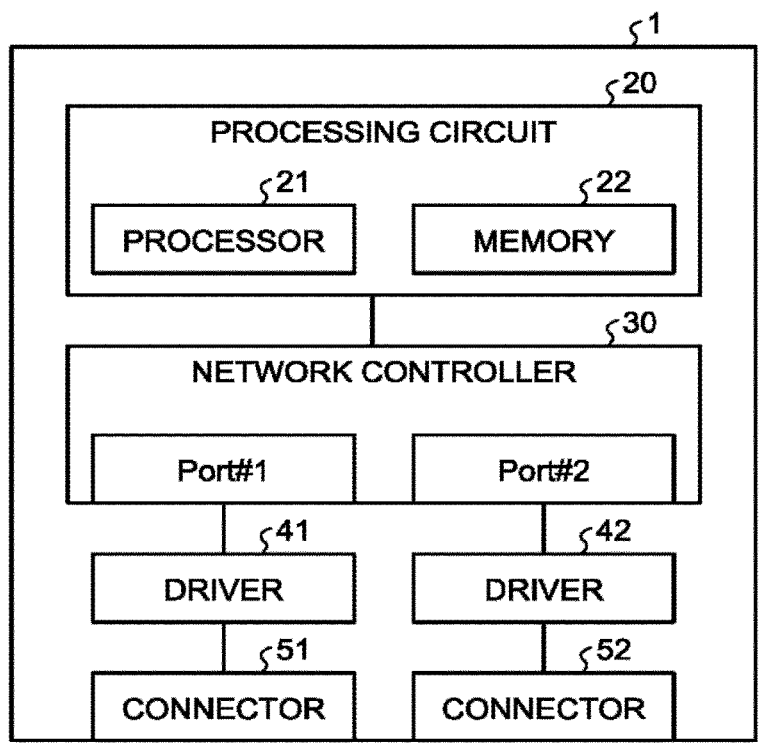
FIG. 4 is a diagram illustrating an exemplary hardware configuration of the communication device according to the first embodiment.

Next, a hardware configuration of the communication device 1 will be described. FIG. 4 is a diagram illustrating an exemplary hardware configuration of the communication device according to the first embodiment. The communication device 1 includes a processing circuit 20 including a processor 21 and a memory 22, a network controller 30 which exchanges a communication frame with the other communication device 1, driver circuits 41 and 42 which perform signal processing including level conversion processing on an input signal and output the processed signal, and connectors 51 and 52 for connecting communication cables.

The processor 21 is, for example, a Central Processing Unit (CPU) (also referred to as central processing device, processing device, arithmetic device, microprocessor, microcomputer, processor, and Digital Signal Processor (DSP)) or a system Large Scale Integration (LSI). The memory 22 is, for example, a nonvolatile or volatile semiconductor memory such as a Random Access Memory (RAM), a Read Only Memory (ROM), a flash memory, an Erasable Programmable Read Only Memory (EPROM), an Electrically Erasable Programmable Read-Only Memory (EEPROM), a magnetic disk, a flexible disk, an optical disk, a compact disk, a mini disk, or a Digital Versatile Disc (DVD). The communication cables are connected to the connectors 51 and 52. In the processing circuit 20, the processor 21 reads and executes a program for realizing an operation of the communication device 1 from the memory 22, thereby performing various kinds of functions.

Although the number of communication ports (ports #1 and #2) included in the network controller 30 is two, this is merely an example, and the number of communication ports may be three or more. Instead of the general-purpose processor 21 and memory 22, the processing circuit 20 may be realized by a single circuit, a composite circuit, a programmed processor, a parallel-programmed processor, an Application Specific Integrated Circuit (ASIC), a Field Programmable Gate Array (FPGA), or dedicated hardware of combination of them.

The clocking unit 11, the time synchronization unit 12, the transmission period setting unit 13, and the communication processing unit 14 illustrated in FIG. 3 are implemented by the network controller 30. It should be noted that the clocking unit 11, the time synchronization unit 12, the transmission period setting unit 13, and the communication processing unit 14 can also be implemented by the processing circuit 20.

Figure 5:
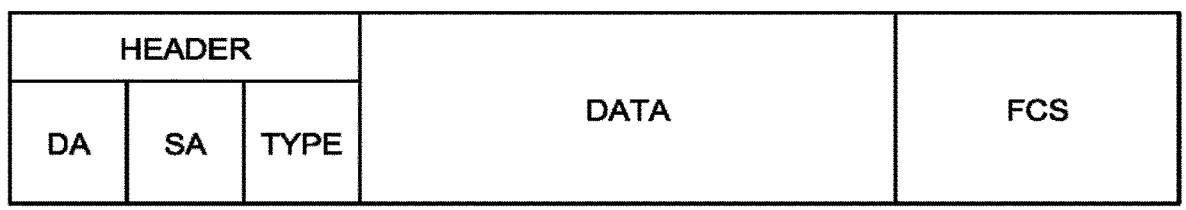
FIG. 5 is a diagram illustrating an exemplary configuration of a frame transmitted and received by the communication device according to the first embodiment.

FIG. 5 is a diagram illustrating an exemplary configuration of a frame exchanged between the communication device according to the first embodiment and the other communication device. The frame illustrated in FIG. 5 indicates a structure of a frame in compliance with the Ethernet (registered trademark) standard. The frame illustrated in FIG. 5 includes a header (Header) in which information on a transmission source and a destination of the frame, and the like is stored a data field (Data) in which data is stored, and a field (Frame Check Sequence (FCS)) in which information for error detection is stored. Furthermore, the header includes a destination address field (Destination Address (DA)), a transmission source address field (Source Address (SA)), and a type field (Type). In the type field, identification information of an upper layer protocol stored in the data field is stored. The header may include tag information such as a VLAN (Virtual Local Area Network) tag in which an identifier of the VLAN or the like is stored.

Next, a specific example of the network system 100 according to the embodiment will be described.

Figure 6:
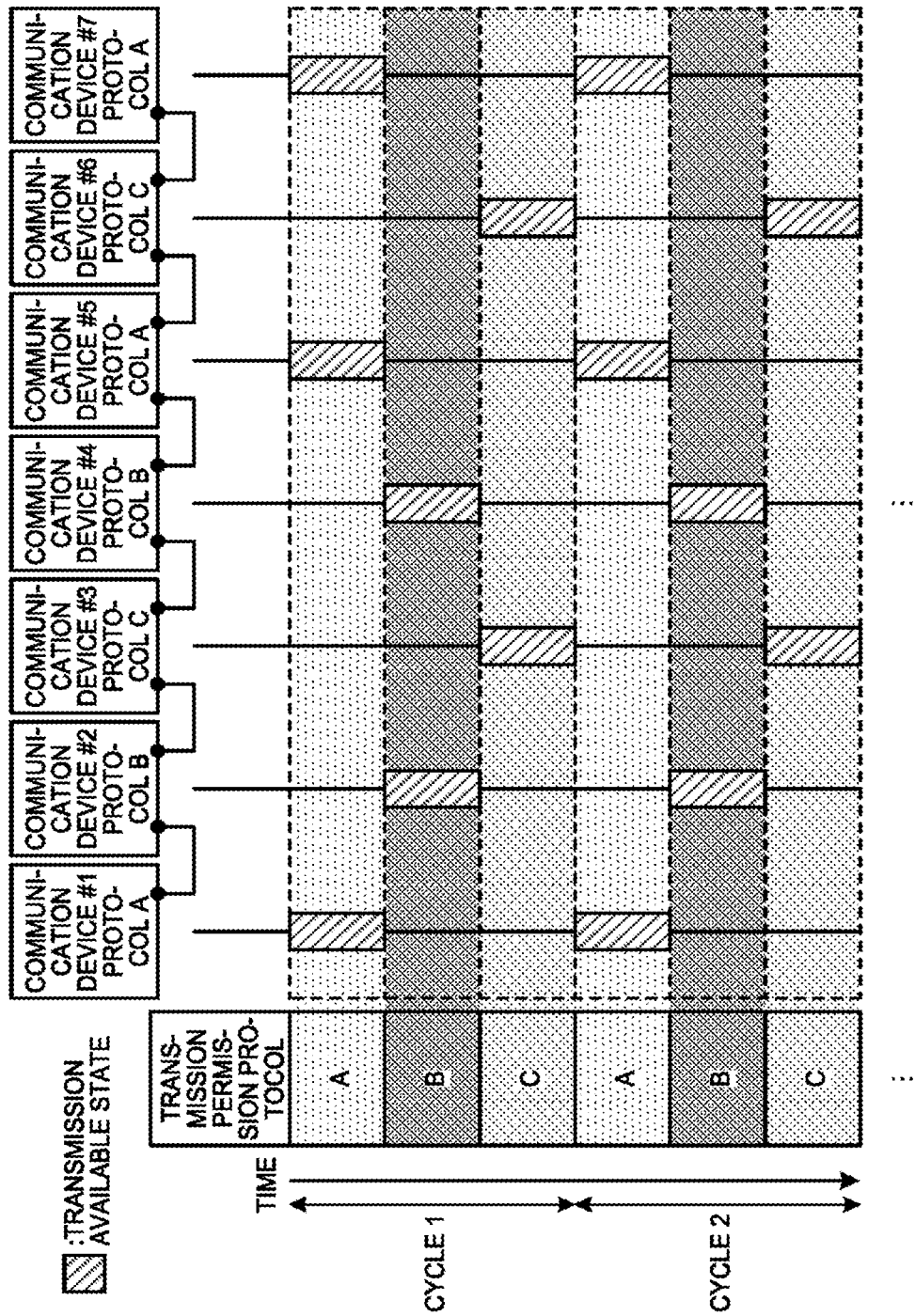
FIG. 6 is a diagram illustrating a first specific example of the network system according to the first embodiment.

FIG. 6 is a diagram illustrating a first specific example of the network system according to the first embodiment. FIG. 6 illustrates an example of the network system 100 having a structure in which seven communication devices #1 to #7 are connected by line. In this example, the communication devices #1, #5, and #7 support the communication protocol A, the communication devices #2 and #4 support the communication protocol B, and the communication devices #3 and #6 support the communication protocol C. In other words, the communication devices #1, #5, and #7 are devices each performing communication according to the communication protocol A, the communication devices #2 and #4 are devices each performing communication according to the communication protocol B, and the communication devices #3 and #6 are devices each performing communication according to the communication protocol C. As one example, the configuration is based on the premise that the communication devices #1, #5, and #7 supporting the communication protocol A can be communication devices which periodically exchange the control data, the communication devices #2 and #4 supporting the communication protocol B can be communication devices which irregularly exchange the control data, and the communication devices #3 and #6 supporting the communication protocol C can be communication devices which irregularly exchange general data other than the control data. The control data which is periodically exchanged corresponds to data for controlling a servo amplifier, a servomotor, various sensors or data for detecting presence of an abnormality occurrence. The control data which is irregularly exchanged corresponds to data indicating details of the abnormality, data for detecting a communication device, data for setting the network, or the like.

In a case of the example illustrated in FIG. 6, each communication cycle is formed of a period A which is a first transmission permission period during which the data transmission by the communication device supporting the communication protocol A is permitted, a period B which is a second transmission permission period during which the data transmission by the communication device supporting the communication protocol B is permitted, and a period C which is a third transmission permission period during which the data transmission by the communication device supporting the communication protocol C is permitted. Accordingly, the communication devices #1, #5, and #7 perform transmission with the communication protocol A supported by the communication devices #1, #5, and #7 in the period A of each cycle. Similarly, the communication devices #2 and #4 perform transmission with the communication protocol B supported by the communication devices #2 and #4 in the period B of each cycle. The communication devices #3 and #6 perform transmission with the communication protocol C supported by the communication devices #3 and #6 in the period C of each cycle. In the example illustrated in FIG. 6, the lengths of the periods A, B, and C are equal to each other.

What can be exemplified as the communication protocols A to C are a protocol under which data requiring transmission with low delay is periodically transmitted, a protocol under which data requiring transmission with low delay is non-periodically transmitted, and a protocol under which data that does not need transmission with low delay is transmitted. In other words, in the example illustrated in FIG. 6, it is possible that the communication protocol A is a protocol for periodically transmitting data requiring transmission with low delay, the communication protocol B is a protocol for non-periodically transmitting data requiring transmission with low delay, and the communication protocol C is a protocol for transmitting data which does not need transmission with low delay. Furthermore, in the example illustrated in FIG. 6, it is possible that the communication protocol A is a protocol for non-periodically transmitting data requiring transmission with low delay, the communication protocol B is a protocol for periodically transmitting data requiring transmission with low delay, and the communication protocol C is a protocol for transmitting data which does not need transmission with low delay. The invention is not limited to the above examples regarding which of the periods A, B, and C constituting a single cycle is used and which of the communication protocols is used to transmit data.

The protocol for periodically transmitting data requiring transmission with low delay corresponds to a communication protocol for cyclically, that is, periodically exchanging the control data between a controlling apparatus and a controlled apparatus in control of an industrial machine, but the present invention is not necessarily limited to this example. The communication for cyclically exchanging the control data between the controlling apparatus and the controlled apparatus is referred to as cyclic communication. The data requiring the low delay transmission, represented by the control data periodically exchanged in the cyclic communication is sometimes referred to as real-time data. Furthermore, the protocol for non-periodically transmitting data requiring transmission with low delay corresponds to a communication protocol for non-periodically, that is, irregularly exchanging the control data between a controlling apparatus and a controlled apparatus in control of an industrial machine, but the invention is not limited to this example. Communication for irregularly exchanging the control data between the controlling apparatus and the controlled apparatus is referred to as transient communication. The data exchanged in the transient communication is sometimes referred to as transient data. CC-Link IE (registered trademark) can be used as a communication method used for the control of the industrial machine, but the communication method to be used is not limited to this example. Transmission Control Protocol/Internet Protocol (TCP/IP) can be used as the protocol for transmitting data which does not need transmission with low delay, but the invention is not limited to this example.

When receiving the data, that is, the frame of the communication protocol which is not supported by a communication device, the corresponding one of the communication devices #2 to #6 other than the line-connected communication devices situated at both ends transfers the received data. However, each communication device does not transfer data which has been received at a timing when the data should not be received in a normal situation. Each communication device does not transfer the data, for example, in a case of receiving data of the communication protocol different from the data supporting the communication protocol A in the period A. Each communication device confirms information stored in the type field in the header of the received frame to thereby recognize a protocol of the received data. In a case where a VLAN tag is included in the header of the received frame, the protocol may be recognized based on information stored in the VLAN tag. In a case where the communication device has determined not to transfer the received data, the communication device discards the received data or transfers the data after waiting for the period covering the communication protocol of the received data. For example, in a case where the communication device #4 receives data of the communication protocol A in the period B of the cycle 1, the communication device #4 holds the received data and transmits the held data when the period A of a cycle 2 comes.

In this way, since each of the communication devices #1 to #7 illustrated in FIG. 6 transmits data in the transmission permission period during which the data transmission with the communication protocol supported by the communication device is permitted, the effect from the data transmission with the other communication protocol can be avoided. That is, an increase in the transmission delay time caused by the effect from the data transmission with the other communication protocol can be prevented. Furthermore, when each of the communication devices #1 to #7 receives the data received at the timing at which the data should not be received in a normal situation, that is, the data having been transmitted in a period other than the predetermined transmission permission period, the communication devices #1 to #7 do not transfer the data. Therefore, the effect of the data transmitted at the wrong timing on the data transmission with the other communication protocol can be prevented.

In FIG. 6, each communication device supports a single communication protocol, but each communication device may support two or more communication protocols. For example, the communication device #1 may be a communication device supporting the communication protocols A and B, and the communication device #5 may be a communication device supporting the communication protocols A and C. In this case, the communication device #1 transmits data under the communication protocol A in the period A and transmits data under the communication protocol B in the period B. The communication device #5 transmits data under the communication protocol A in the period A and transmits data under the communication protocol C in the period C.

In addition, in the example illustrated in FIG. 6, the lengths of the transmission permission periods in which the transmission with the communication protocols are equal, but the lengths of the transmission permission periods of the communication protocols may be different from each other. Furthermore, in the example illustrated in FIG. 6, the number of transmission permission periods of each communication protocol is one in each communication cycle, but two or more transmission permission periods may be provided for each communication cycle. For example, each transmission permission period may be set as in the second specific example illustrated in FIG. 7. In the second specific example illustrated in FIG. 7, the length of the period A in which the transmission by the communication device supporting the communication protocol A is permitted is longer than the length of the period B in which the transmission by the communication device supporting the communication protocol B is permitted and longer than the length of the period C in which the transmission by the communication device supporting the communication protocol C is permitted. Furthermore, a single communication cycle includes two periods A. As a modification of the configuration of the communication cycle illustrated in FIG. 7, what is contemplated is a configuration including three or more periods A, a configuration including two or more periods B, a configuration including a plurality of periods A and a plurality of periods B, or the like configuration. For example, a single communication cycle may be formed by "period A+period B+period A+period C+period A", or a single communication cycle may be formed by "period A+period B+period A+period B+period A+period C." A single communication cycle may also be formed by "period A+period C+period A+period B+period A+period C." In this way, it is preferable that a single communication cycle including the period A, the period B, and the period C is configured to include at least one period A, at least one period B, and at least one period C.

Figure 7:
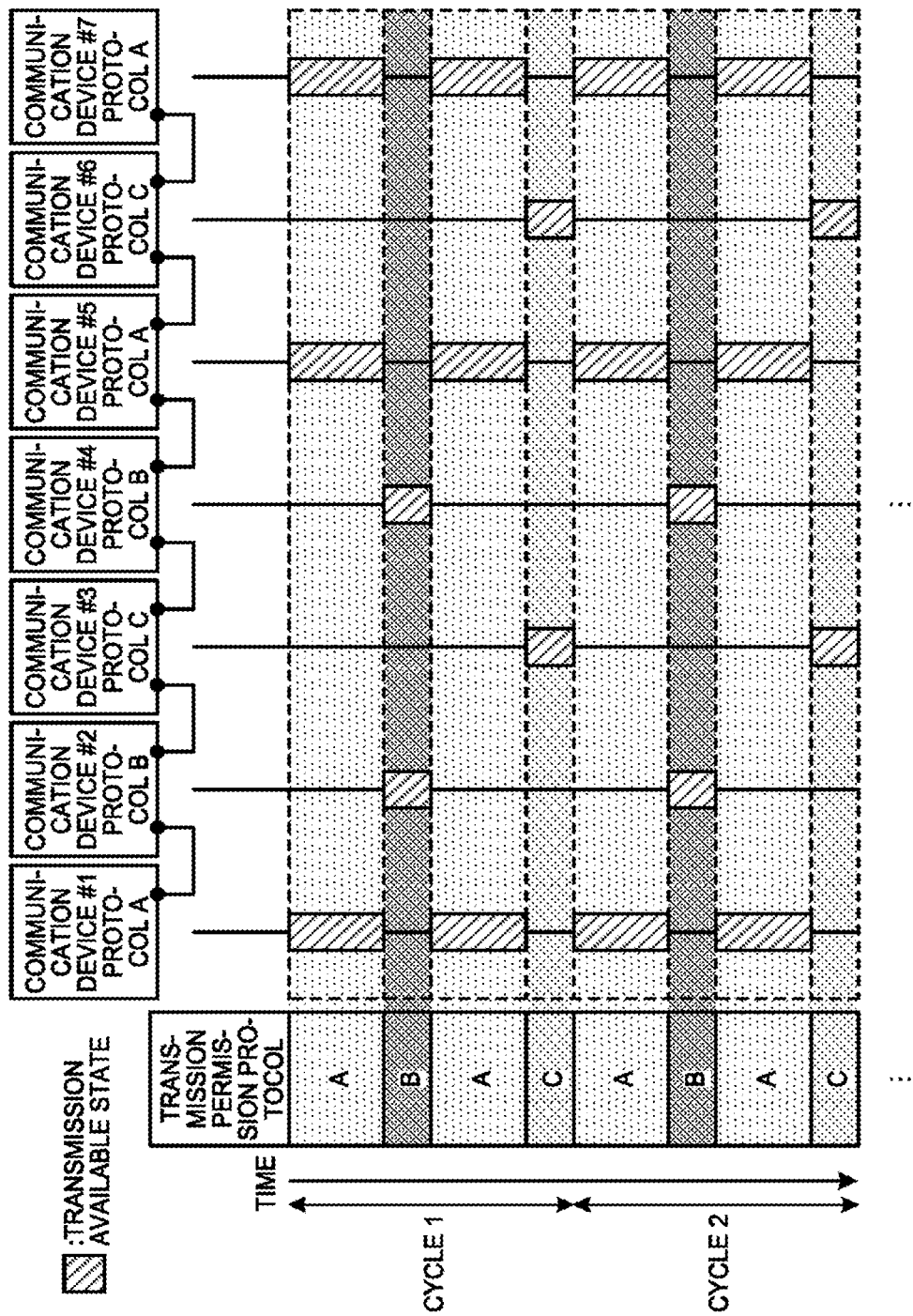
FIG. 7 is a diagram illustrating a second specific example of the network system according to the first embodiment.

In a case of the configuration illustrated in FIG. 7, the similar effect to the effect in a case of the configuration illustrated in FIG. 6 can be obtained. In a case where the communication protocols supported by the communication devices constituting the network system 100 have unevenness, that is, in a case where the number of communication devices supporting a specific communication protocol is larger than the number of communication devices supporting the other communication protocol, transmission permissions can be equally given to all the communication devices by changing the length of the transmission permission period for each communication protocol. Also in a case where a frequency of communication occurrence with a specific communication protocol is higher than a frequency of communication occurrence with the other communication protocol although there is no difference among the numbers of communication devices supporting all the communication protocols, similarly the transmission permissions can be equally given to the all communication devices.

Figure 8:
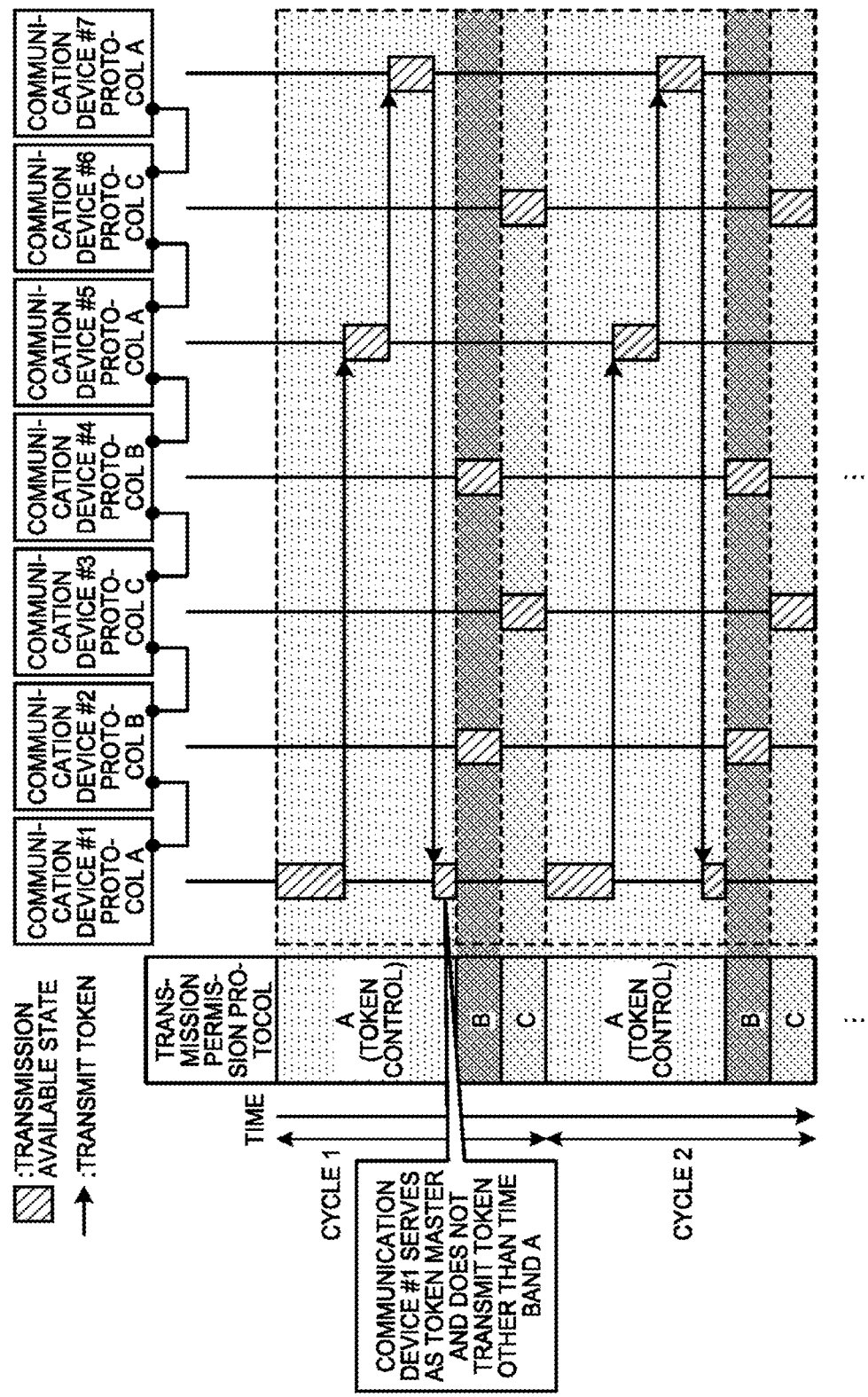
FIG. 8 is a diagram illustrating a third specific example of the network system according to the first embodiment.

FIG. 8 is a diagram illustrating a third specific example of the network system according to the first embodiment.

Similarly to the examples illustrated in FIGS. 6 and 7, FIG. 8 illustrates an example of the network system 100 having a configuration in which the seven communication devices #1 to #7 are connected by line. In this example, the communication devices #1, #5, and #7 support the communication protocol A, the communication devices #2 and #4 support the communication protocol B, and the communication devices #3 and #6 support the communication protocol C. FIG. 8 illustrates an operation example in a case where the communication protocol A is a token control protocol, that is, a protocol using a token passing method. As an example of use of the token passing method, there is the CC-Link IE (registered trademark) which is a network connected with industrial machines.

From among the communication devices in the example illustrated in FIG. 8, the operations of the communication devices #2 and #4 supporting the communication protocol B and the operations of the communication devices #3 and #6 supporting the communication protocol C are much the same as the operations of the communication devices #2 and #4 and the operations of the communication devices #3 and #6 in the examples illustrated in FIGS. 6 and 7, respectively.

In the example illustrated in FIG. 8, from among the communication devices #1, #5, and #7 supporting the communication protocol A, the communication device #1 operates as a token master for controlling a transmission timing of a token, and the communication devices #5 and #7 operate as slaves. The token master is a communication device capable of transmitting a token first in each transmission permission period.

As illustrated in FIG. 8, in a case where the transmitted token is passed around and is returned to the token master, the token master determines whether the token can be retransmitted in the transmission permission period, more specifically, whether or not the token to be retransmitted is returned to the token master within the transmission permission period if the token is retransmitted. In a case where the token master has determined that the retransmission is not available, the token master continuously holds the token without retransmitting the token, and transmits the token in the next transmission permission period, that is, when the period A in which the transmission with the communication protocol A is permitted comes.

Here, the maximum time in which the token master transmits the token and the token is passed around the communication devices performing communication with the token control protocol and is returned to the token master is determined preliminarily. That is, the maximum value of token round time that is the required time from the transmission of the token by the token master until the token comes back to the token master is determined based on the number of communication devices performing communication with the token control protocol. For this reason, in a case where remaining time in the period A at the time when the token has been passed around and returned is smaller than the maximum value of the token round time, the token master determines that the token cannot be retransmitted. By setting the length of the period A illustrated in FIG. 8 to an integral multiple of the maximum value of the token round time, the token master can easily determine whether the token which has been returned to the token master can be retransmitted. In a case where the length of the period A is set to n times (n is a positive integer) of the maximum value of the token round time, the token master determines that the token cannot be retransmitted after the token is transmitted n times in one period A. FIG. 8 is an example of a case where the length of the period A is set to the maximum value of the token round time, that is, a case of n=1. The maximum value of the token round time is determined in consideration of the transmission delay time on the network, processing delay time of each communication device, and a maximum amount of data which can be transmitted by each communication device.

In this way, the communication devices forming the network system 100 can include the communication device performing communication with the token control protocol.

In the example illustrated in FIG. 8, the number of token masters is one, but two or more token masters may be provided. In a case of two or more token masters, when receiving the token, each token master determines whether or not the token can be transmitted to the next token master within the transmission permission period in which transmission by the token master is permitted, that is, the transmission permission period in which the transmission with the token control protocol is permitted. When determining that the token can be transmitted to the next token master within the transmission permission period, each token master transmits the token. When determining that the token cannot be transmitted to the next token master within the transmission permission period, each token master transmits the token after waiting for the next transmission permission period without transmitting the token in the current transmission permission period. Each token master previously hold information on a token round route and information on a token master next to the token master on the round route.

Figure 9:
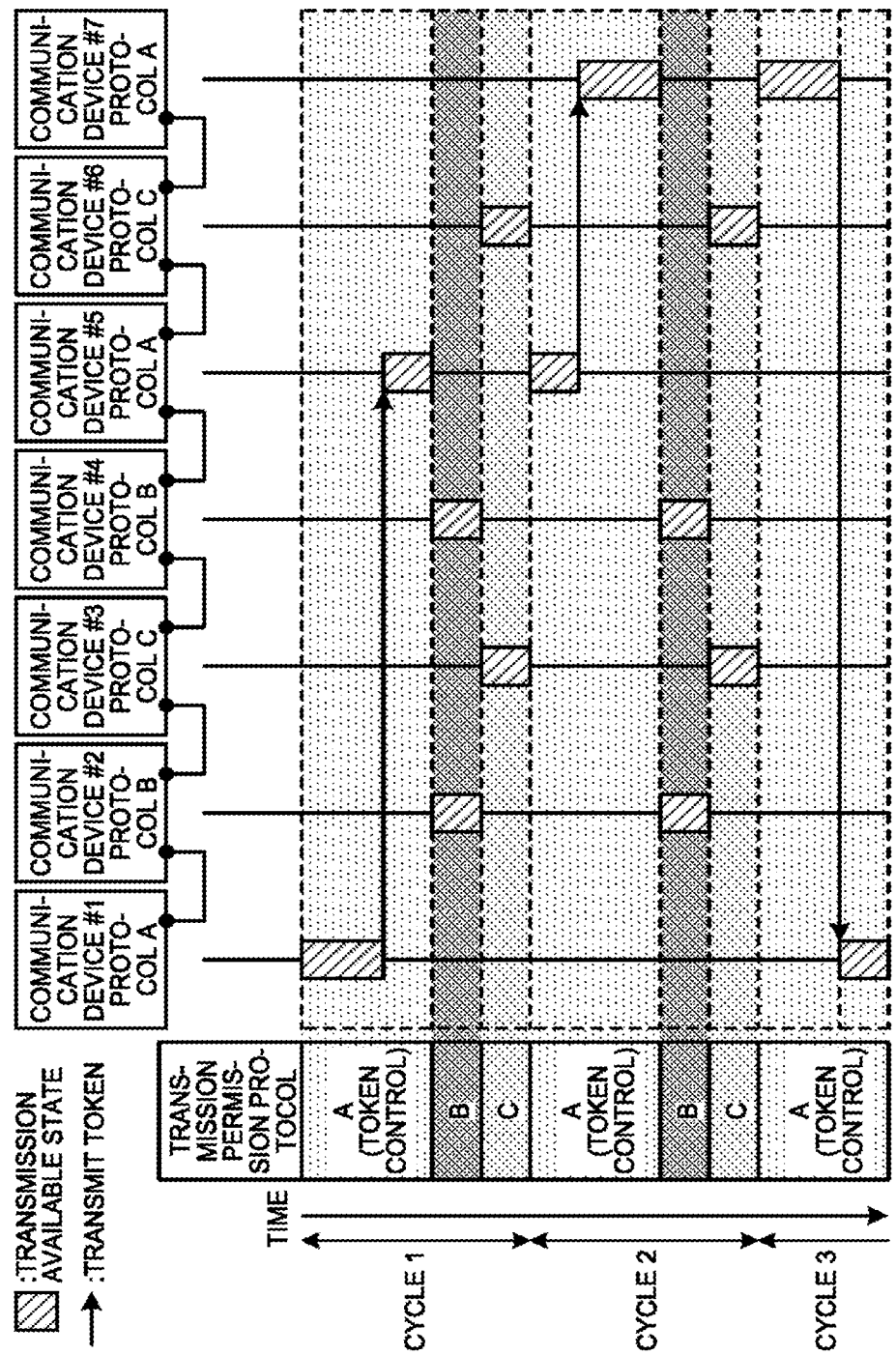
FIG. 9 is a diagram illustrating a fourth specific example of the network system according to the first embodiment.

FIG. 9 is a diagram illustrating an example in a case where two or more token masters are provided. FIG. 9 is a diagram illustrating a fourth specific example of the network system according to the first embodiment. As illustrated in FIG. 9, all of the communication devices #1, #5, and #7 supporting the token control protocol may operate as token masters.

Figure 10:
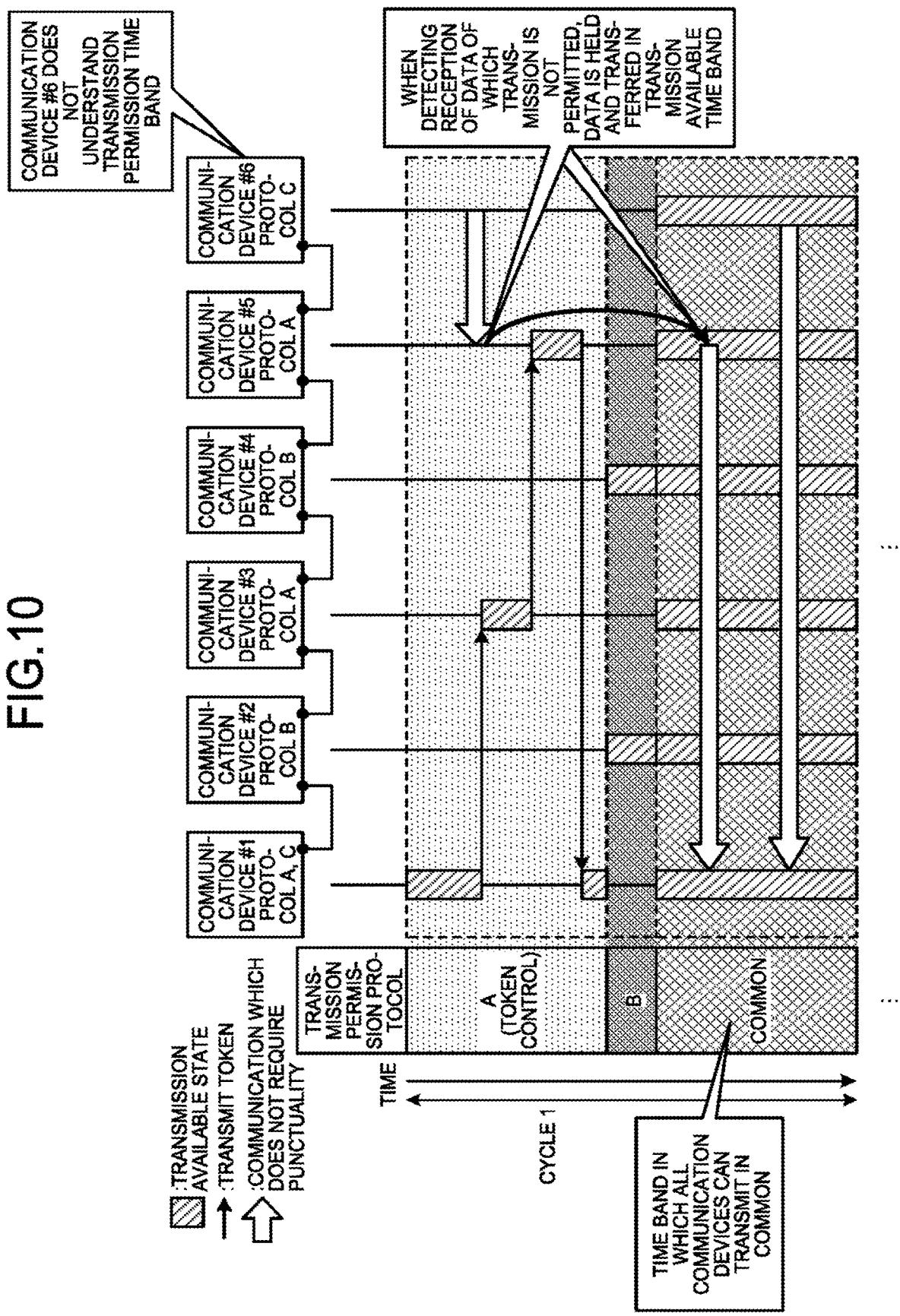
FIG. 10 is a diagram illustrating a fifth specific example of the network system according to the first embodiment.

FIG. 10 is a diagram illustrating a fifth specific example of the network system according to the first embodiment. In the first to fourth specific examples described so far, description is given based on the premise that all of the communication devices constituting the network system currently recognize the transmission permission periods in which the data transmission of the communication devices is permitted. However, even in a case where some of the communication devices do not recognize the transmission permission period, an increase in the transmission delay time of the data transmitted with the specific communication protocol can be prevented. An operation in a case where some of the communication devices do not recognize the transmission permission period will be described with reference to FIG. 10. FIG. 10 illustrates an example of the network system 100 having a configuration in which six communication devices #1 to #6 are connected by line. In this example, the communication devices #1, #3, and #5 support the communication protocol A, the communication devices #2 and #4 support the communication protocol B, and the communication devices #1 and #6 support the communication protocol C. In the example in FIG. 10, the communication device #1 supports the communication protocols A and C. Furthermore, in the example in FIG. 10, each communication cycle is formed of the period A which is a transmission permission period during which the transmission by the communication device supporting the communication protocol A is permitted, the period B which is a transmission permission period during which the transmission by the communication device supporting the communication protocol B is permitted, and the common period which is a transmission permission period during which the transmission by the communication devices #1 to #6 is permitted regardless of the supported communication protocol. The protocol A is a token control protocol.

In the example illustrated in FIG. 10, a transmission permission period is not provided for the communication protocol C, and the communication device #6 supporting the communication protocol C can perform transmission only in the common period. Furthermore, the communication device #6 is a general personal computer or the like, and does not set each transmission permission period, that is, does not recognize the transmission permission period in which the transmission by the communication device #6 is permitted. For this reason, the communication device #6 may transmit data of the communication protocol C in a period other than the common period in which transmission is originally available. In the illustrated example, the communication device #6 transmits data of the communication protocol C to the communication device #1 in the period A and the common period, and the communication device #5 receives the transmitted data. The communication device #5 determines that the data received from the communication device #6 in the period A is data of the communication protocol other than the communication protocol A and holds the received data without transferring the received data. Thereafter, when the common period comes, the communication device #5 transfers the data of the communication protocol C, which has been received from the communication device #6 and held. In addition, the communication device #5 immediately transfers data received from the communication device #6 in the common period. In a case where the network system formed by the communication devices #1 to #6 is an Ethernet (registered trademark) based network, for example, CC-Link IE, or the like, the communication device #5 confirms information stored in the header of the frame, specifically, information stored in the Type field illustrated in FIG. 5, so as to determine whether or not the data received in a period other than the common period is data whose transfer is permitted in the period.

Although a case of the communication device #5 has been described, the same applies to the communication devices #2 to #4. For example, in a case of receiving data transmitted with the communication protocol B in the period A, the communication device #2 holds the received data and transfers the data in the coming period B. Furthermore, in a case of receiving data transmitted with the communication protocol C in the period A or the period B, the communication device #2 holds the received data and transfers the data in the coming common period. Similarly, in a case of receiving data transmitted with the communication protocol A in the period B, the communication device #2 holds the received data and transfers the data in the coming common period. In each of the communication devices #2 to #5, the communication processing unit 14 determines whether to immediately transfer the received data or temporarily hold the received data.

In this way, in the network system of the example illustrated in FIG. 10, a dedicated transmission period which is a transmission permission period in which transmission with a specific communication protocol is permitted and the common period in which transmission with all the communication protocols is permitted are provided. In a case where the communication device recognizing the dedicated transmission period and the common period receives the data other than the data whose transmission in the dedicated transmission period is permitted, the communication device transfers the data after waiting for the period in which the transmission of the received data is permitted. Accordingly, even in a case where the communication device such as a general personal computer, that is, the communication device which does not recognize the dedicated transmission period and the common period and irregularly transmits data is connected to the network system, an effect of the data irregularly transmitted from the communication device can be eliminated, and the data transmitted with a specific communication protocol can be transmitted with low delay.

As described above, in the network system according to the present embodiment, the transmission permission period in which the data transmission by each communication device forming the network is permitted is individually provided for each communication protocol, and each communication device transmits data in the transmission permission period supporting the currently used communication protocol. By doing so, the delay in the data transmission with each communication protocol caused by the effect of the data transmission with the other communication protocol can be prevented. Furthermore, the control data for the industrial machine including the control data periodically transmitted as data requiring low delay transmission and the control data non-periodically transmitted can be transmitted with low delay.

Second Embodiment

Next, the network system according to a second embodiment will be described. The configuration of the network system is similar to that of the first embodiment.

In the present embodiment, an example of an operation for a communication device forming the network system to transmit data to the other communication device will be described. In the present embodiment, description is given for an operation example in a case where one of the communication devices forming the network system operates as a master, the others operate as slaves, and the communication device operating as the master exchanges various kinds of data with the communication devices operating as the slaves in the network system.

Figure 11:
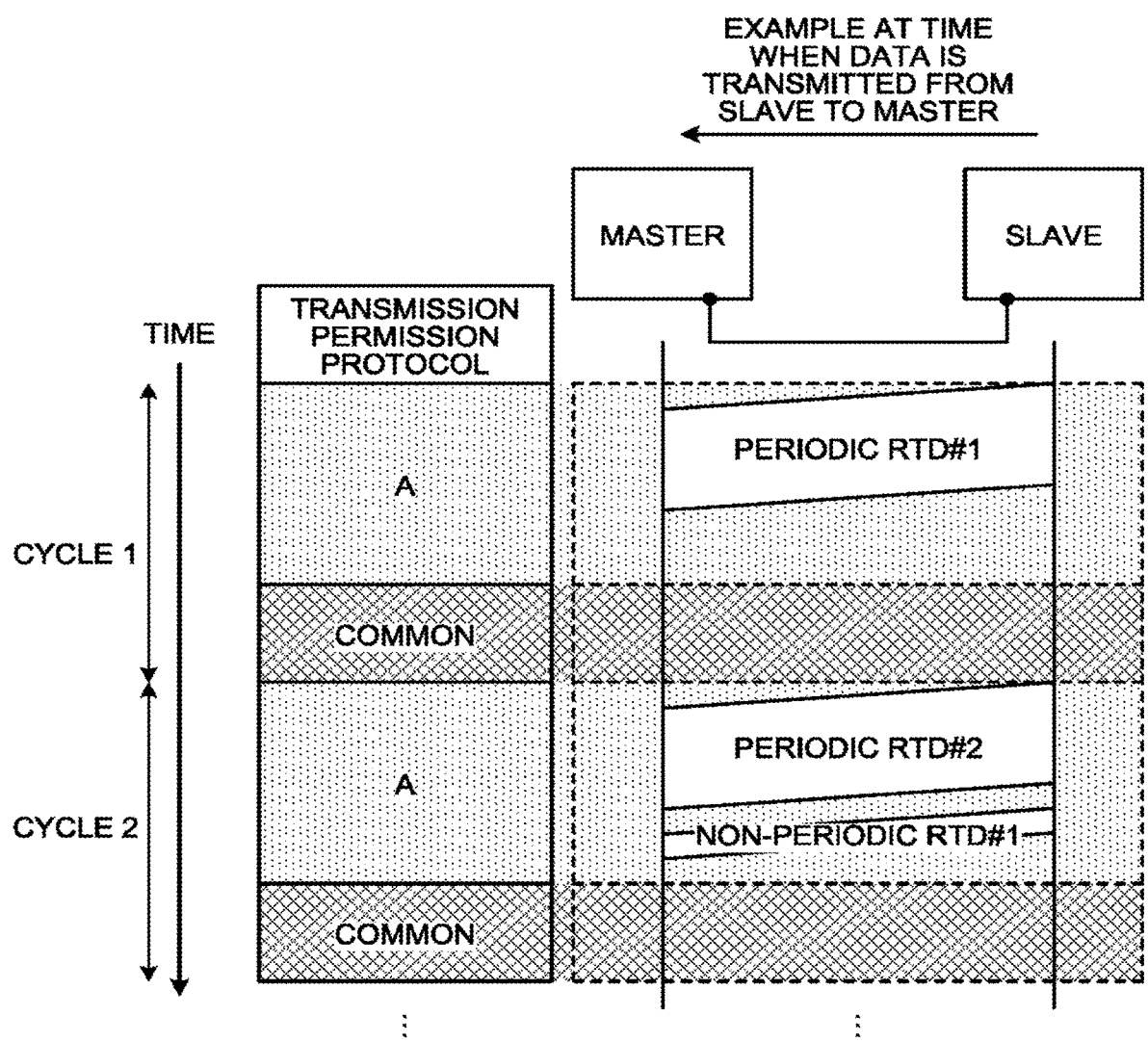
FIG. 11 is a diagram illustrating a first example of a data transmission operation according to a second embodiment.

FIG. 11 is a diagram illustrating a first example of a data transmission operation of the network system according to the second embodiment. FIG. 11 illustrates an operation example in a case where the slave communication device (referred to as slave below) transmits data to the master communication device (referred to as master below) in the network in which the period A and the common period are set, the period A being a transmission permission period in which the transmission by the communication device supporting the communication protocol A is permitted, the common period being a transmission permission period in which the transmission by all the communication devices is permitted regardless of the supported communication protocol. The master can receive data transmitted with the communication protocol A and data transmitted with the other communication protocols. The slave supports the communication protocol A and transmits data according to the communication protocol A. The same applies to second to ninth examples described later. In addition, the slave transfers the data transmitted with a communication protocol other than the communication protocol A in the common period.

FIG. 11 illustrates an example of a data transmission operation in a case where the slave transmits periodic real-time data and non-periodic real-time data of the communication protocol A in one and the same period, that is, the period A, in different communication frames. In FIG. 11, the periodic real-time data is described as "periodic RTD #1" and so on, and the non-periodic real-time data is described as "non-periodic RTD #1" and so on. The same applies to diagrams illustrating the second to ninth examples described later. The periodic real-time data, which is first data, requires transmission with low delay and is periodically transmitted in the control of the industrial machine. Similarly to the periodic real-time data, the non-periodic real-time data which is second data is data requiring transmission with low delay in the control of the industrial machine, but being uncertain about when the data is transmitted. However, in the present embodiment, a timing when the non-periodic real-time data is transmitted is not completely uncertain, the possible transmission timing is determined in advance. For example, there is the premise that the non-periodic real-time data is transmitted at a timing corresponding to an integral multiple of the transmission cycle of the periodic real-time data. The same applies to second to ninth examples described later. There may be a case where the non-periodic real-time data is uncertain and the possible transmission timing is not determined in advance.

In a case of the example illustrated in FIG. 11, the non-periodic real-time data is not transmitted in the period A of the cycle 1 but is transmitted in the period A of the cycle 2 subsequent to the periodic real-time data. The non-periodic real-time data corresponds to data requiring the low delay transmission of the transient data which is the control data transmitted in the transient communication for the control of the industrial machine, but the invention is not limited to this example. The transient data includes data which does not require the low delay transmission, that is, data which does not have a disadvantage even when the transmission delay time becomes longer. The periodic real-time data corresponds to the control data transmitted in the cyclic communication for the control of the industrial machine, but the invention is not limited to this example. Each cycle, that is, a cycle which starts with the period A is determined to be similar to the cycle in which the periodic real-time data is transmitted. In addition, the length of the period A is determined in consideration of the cycle in which the periodic real-time data is transmitted, a data amount of the periodic real-time data, variations in the transmission delay time, the maximum data amount of the non-periodic real-time data, and the like.

In the common period, the slave transmits data other than the non-periodic real-time data, which is irregularly generated, that is, the data which does not have a large disadvantage even when the transmission delay time becomes longer. The slave may determine whether or not the data is data which does not have a large disadvantage even when the transmission delay time becomes longer, based on the communication protocol used for the data transmission, or may determine the same based on the information in the header of the frame in which the data is stored. In this way, in a case of the example illustrated in FIG. 11, the period A is set as a transmission permission period in which the data transmission with a protocol for transmitting data requiring the low delay transmission is permitted. The common period is set as a transmission permission period in which the data transmission with a protocol for transmitting data which does not require the low delay transmission is permitted. In the common period, setting is made such that communication with a protocol for transmitting the data requiring the low delay transmission is available.

As illustrated in FIG. 11, even in a case where the configuration includes the communication device supporting the communication protocol for transmitting the periodic real-time data and the non-periodic real-time data, the network system according to the present embodiment can be applied, and the low delay transmission can be realized.

Figure 12:
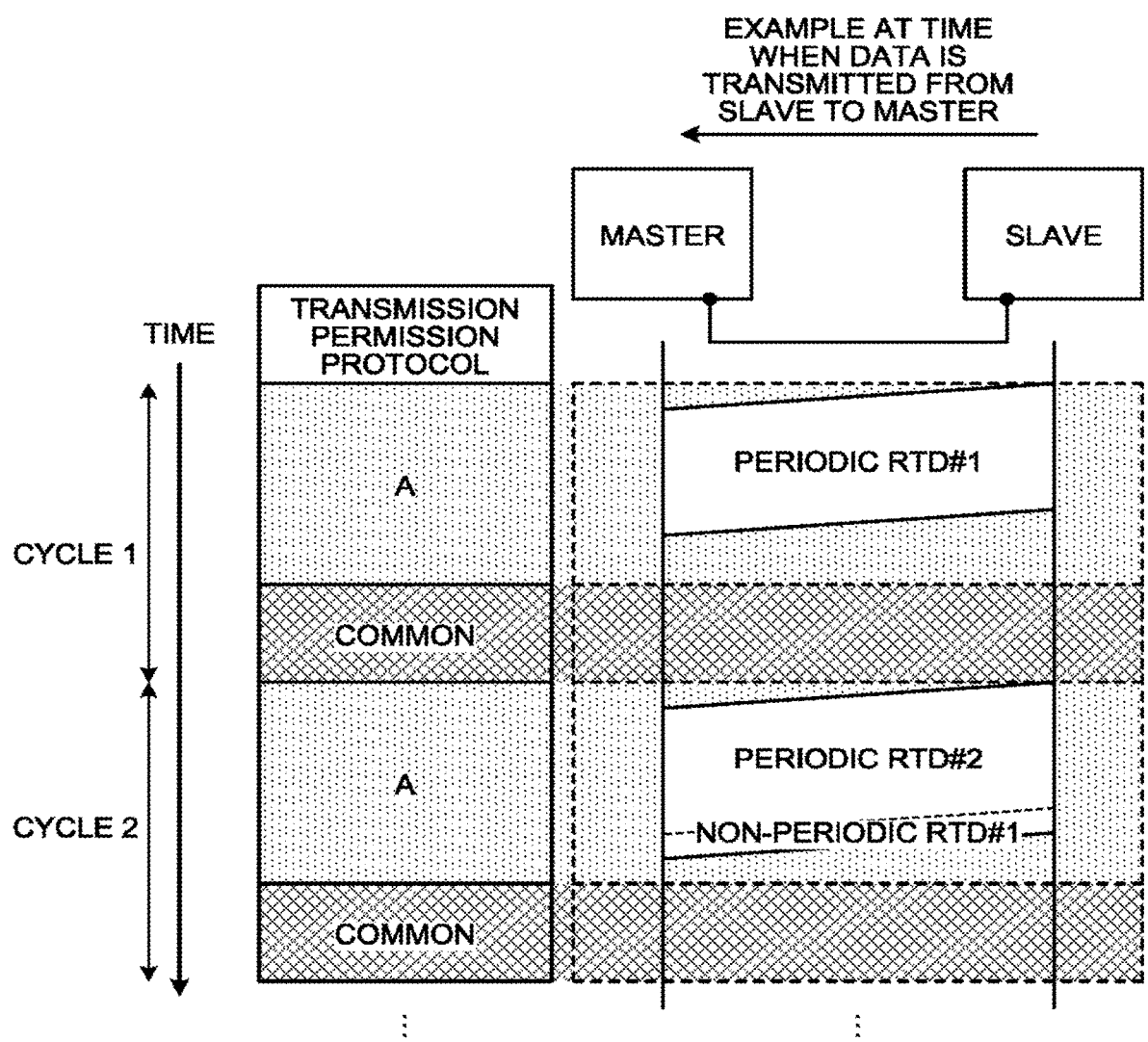
FIG. 12 is a diagram illustrating a second example of the data transmission operation according to the second embodiment.

FIG. 12 is a diagram illustrating a second example of the data transmission operation of the network system according to the second embodiment. Similarly to the example illustrated in FIG. 11, FIG. 12 illustrates an operation example in a case where the slave transmits data to the master in the network in which the period A and the common period are set, the period A being a transmission permission period in which the transmission by the communication device supporting the communication protocol A is permitted, the common period being a transmission permission period in which the transmission by all the communication devices is permitted regardless of the supported communication protocol.

In the example illustrated in FIG. 12, in a case where the slave transmits the periodic real-time data and the non-periodic real-time data in one and the same transmission permission period, the slave stores the periodic real-time data and the non-periodic real-time data in one and the same frame and transmits the stored data as a single frame. By doing so, as compared with the example illustrated in FIG. 11 in which the periodic real-time data and the non-periodic real-time data are transmitted in their respective different frames, a header part of the frame is lessened, and so it is possible to realize efficient transmission, that is, transmission of which a proportion of an overhead other than the data is suppressed to be low. Note that the periodic real-time data and the non-periodic real-time data are data of the communication protocol A. The same applies to the examples described later.

Figure 13:
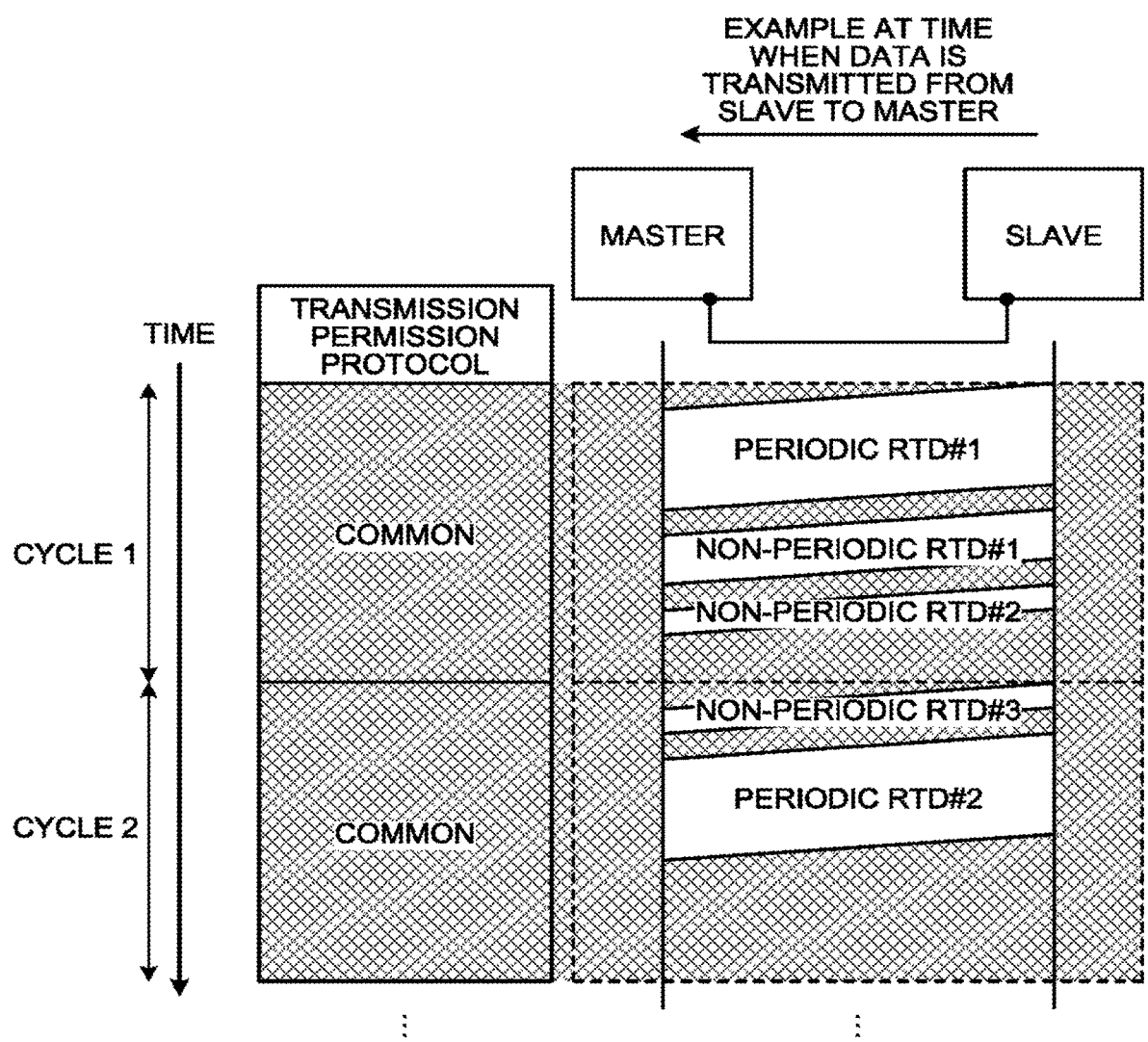
FIG. 13 is a diagram illustrating a third example of the data transmission operation according to the second embodiment.

FIG. 13 is a diagram illustrating a third example of the data transmission operation of the network system according to the second embodiment. FIG. 13 illustrates an operation example in a case where the slave transmits data to the master in the network in which a common period is set, the common period being a transmission permission period in which the transmission by all the communication devices is permitted regardless of the supported communication protocol.

FIG. 13 illustrates an example of a data transmission operation in a case where the slave transmits the periodic real-time data and the non-periodic real-time data of the protocol A in the same common period in their respective different communication frames. A cycle in which the common period is set is determined based on the cycle in which the periodic real-time data is transmitted. Specifically, a cycle in which each common period is set is determined such that the cycle is made similar to a cycle in which the periodic real-time data is transmitted. That is, the length of each common period is set to be substantially the same as that of the cycle in which the periodic real-time data is transmitted.

The periodic real-time data is transmitted in each common period. It is preferable that the periodic real-time data be transmitted in each common period, and the order of the periodic real-time data and the non-periodic real-time data transmitted in the same common period is optional. The example illustrated in FIG. 13 shows a case where transmission of three kinds of non-periodic real-time data, that is, non-periodic real-time data sets #1, #2, and #3 occur between the transmission of the periodic real-time data in the cycle 1 and the transmission of the periodic real-time data in the next cycle 2. In the example illustrated in FIG. 13, the non-periodic real-time data sets #1 and #2 are transmitted in the common period of the cycle 1, and the non-periodic real-time data set #3 is transmitted prior to the periodic real-time data set #2 in the common period of the cycle 2 so as not to increase delay time after being temporarily held by a buffer in the slave.

Similarly to the example illustrated in FIG. 12, the slave may transmit the periodic real-time data and the non-periodic real-time data in a single communication frame.

In a case where the slave transmits data other than the non-periodic real-time data, which is irregularly generated, or more specifically, data which does not have a large disadvantage even when the transmission delay time increases, the slave transmits the data in a common period of the cycle in which the non-periodic real-time data is not generated or a common period of the cycle in which the data amount of non-periodic real-time data to be transmitted is small. That is, the slave preferentially transmits the periodic real-time data and the non-periodic real-time data in each common period and transmits other data in a remaining partial period after the transmission of the periodic real-time data and the non-periodic real-time data is completed.

In this way, in the example illustrated in FIG. 13, the common period is set in consideration of the transmission cycle of the periodic real-time data, the data amount of the periodic real-time data, variations in the transmission delay time, the number of occurrences of non-periodic real-time data, the maximum data amount of each non-periodic real-time data, or the like. Furthermore, in each common period, the slave transmits the periodic real-time data and the non-periodic real-time data requiring the low delay transmission more preferentially than the other data which does not have a disadvantage in increase of transmission delay time. Even in a case of the example illustrated in FIG. 13, the periodic real-time data and the non-periodic real-time data can be transmitted with low delay.

Figure 14:
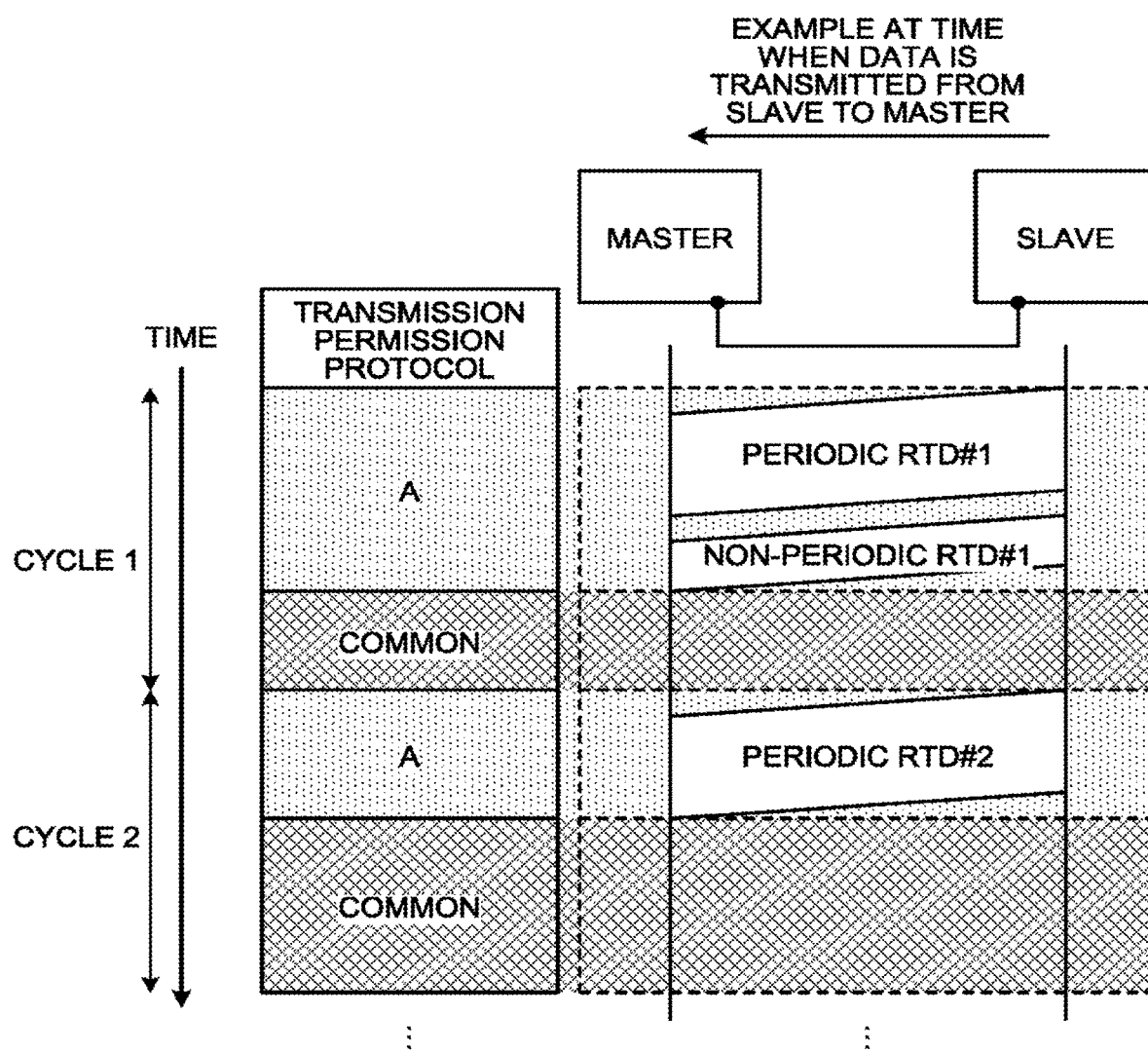
FIG. 14 is a diagram illustrating a fourth example of the data transmission operation according to the second embodiment.

FIG. 14 is a diagram illustrating a fourth example of the data transmission operation of the network system according to the second embodiment. Similarly to FIGS. 11 and 12, FIG. 14 illustrates an operation example in a case where the slave transmits data to the master in the network in which the period A and the common period are set, the period A being a transmission permission period in which the transmission by the communication device supporting the communication protocol A is permitted, the common period being a transmission permission period in which the transmission by all the communication devices is permitted regardless of the supported communication protocol.

Similarly to FIG. 11, FIG. 14 illustrates an example of a data transmission operation in a case where the slave transmits periodic real-time data and non-periodic real-time data of the protocol A in the same period, that is, the period A, in their respective different communication frames. However, in the example illustrated in FIG. 14, the length of the period A is changed according to presence or absence of the non-periodic real-time data. Since the transmission cycle of the periodic real-time data is constant regardless of presence or absence of the non-periodic real-time data, the length of each cycle formed including the period A and the common period is made constant. When the slave completes the transmission of the periodic real-time data and the non-periodic real-time data in each cycle, the slave ends the period A and handles the common period, and when other data which does not have a disadvantage in increase of the transmission delay time, the slave transmits the other data. It is not necessary for the master to accurately recognize whether the current period is the period A or the common period because the master only has to receive the data transmitted from the slave. On the other hand, in a case where it is desired to make the master recognize the period A or the common period, it is preferable that the slave operate as follows. For example, when the slave transmits the periodic real-time data, the slave notifies the master of whether the non-periodic real-time data exists by including information indicating whether to transmit the non-periodic real-time data in one and the same period A in the periodic real-time data. When the master receives the periodic real-time data which does not include the information indicating that the non-periodic real-time data is to be transmitted, the master recognizes the remaining time of the same cycle as the common period.

Although description has been given for a case where a single slave is used, the operation of the slave applies to each slave even in a case where the number of slaves is two or more. When the transmission of the periodic real-time data and the non-periodic real-time data is completed in each cycle, each slave ends the period A and handles the common period, and in a case where the other data exists, the slave transmits the other data. Before the transmission of the periodic real-time data and the non-periodic real-time data is completed, that is, before the period A is ended, when receiving other data which does not correspond to any of the periodic real-time data and the non-periodic real-time data from the other slave, each slave holds the other data, and transmits the held other data to the master after the transmission of the periodic real-time data and the non-periodic real-time data is completed and the period A is ended.

Similarly to the example illustrated in FIG. 12, the slave may transmit the periodic real-time data and the non-periodic real-time data using a single communication frame.

In this way, since the length of the period A and the length of the common period are flexibly changed in each cycle, each slave can transmits the other data immediately after the transmission of the periodic real-time data and the non-periodic real-time data is completed, and transmission delay of the other data can be suppressed to be low.

Figure 15:
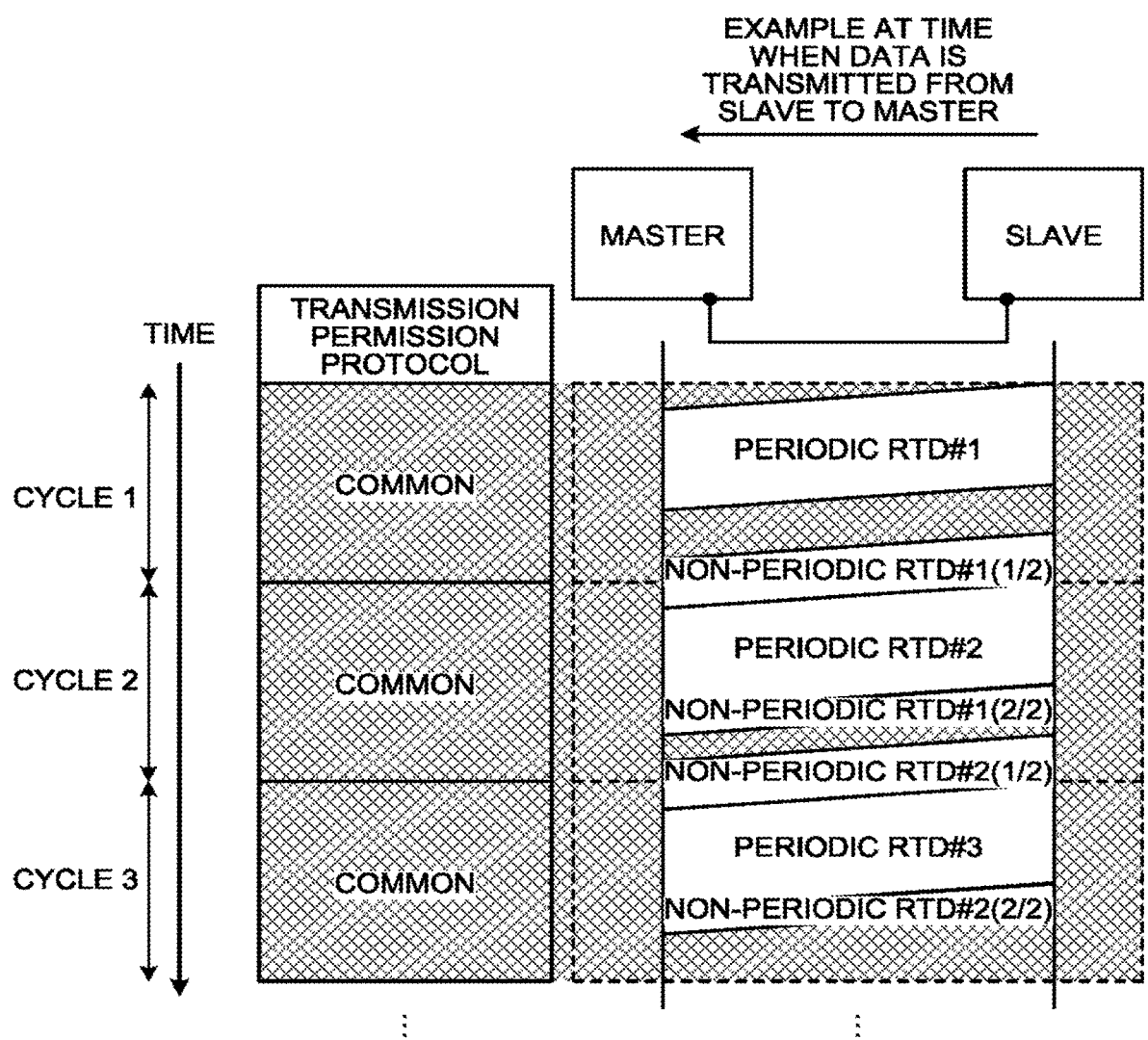
FIG. 15 is a diagram illustrating a fifth example of the data transmission operation according to the second embodiment.

FIG. 15 is a diagram illustrating a fifth example of the data transmission operation of the network system according to the second embodiment. Similarly to FIG. 13, FIG. 15 illustrates an operation example in a case where the slave transmits data to the master in the network in which the common period is set, the common period being a transmission permission period in which the transmission by all the communication devices is permitted regardless of the supported communication protocol.

In the example illustrated in FIG. 15, when transmitting the non-periodic real-time data, the slave determines whether or not the transmission of the non-periodic real-time data is completed before a transmission timing of the next periodic real-time data comes. In a case where the transmission of the non-periodic real-time data cannot be completed before the transmission timing of the next periodic real-time data comes, the slave divides the non-periodic real-time data and generates a first-half data part with a size which can be completely transmitted before the transmission timing of the next periodic real-time data and the remaining second-half data part. Then, the slave transmits the non-periodic real-time data in the first half, the periodic real-time data, and the non-periodic real-time data in the second half to the master in this order. In the example illustrated in FIG. 15, when non-periodic real-time data #1 is generated, the slave determines that the transmission of the non-periodic real-time data #1 cannot be completed before start of transmission of the next non-periodic real-time data #2 comes, divides the non-periodic real-time data #1 into a non-periodic real-time data part #1 (1/2) and a non-periodic real-time data part #1 (2/2), and transmits the divisional data parts of the data before and after the periodic real-time data

2. Similarly, when transmitting non-periodic real-time data #2, the slave divides the non-periodic real-time data #2 into two parts and transmits the data parts before and after the periodic real-time data #3.

In the operation illustrated in FIG. 15, for example, the non-periodic real-time data is divided and transmitted by using a preemption function of the Time Sensitive Networks (TSN) standard provided by The Institute of Electrical and Electronics Engineers, Inc. (IEEE).

In the example illustrated in FIG. 15, since the non-periodic real-time data is divided and transmitted, waiting time, that is, a time band in which both of the periodic real-time data and the non-periodic real-time data are not transmitted can be prevented from occurring. Therefore, effective use of a band and the low delay transmission can be realized.

Figure 16:
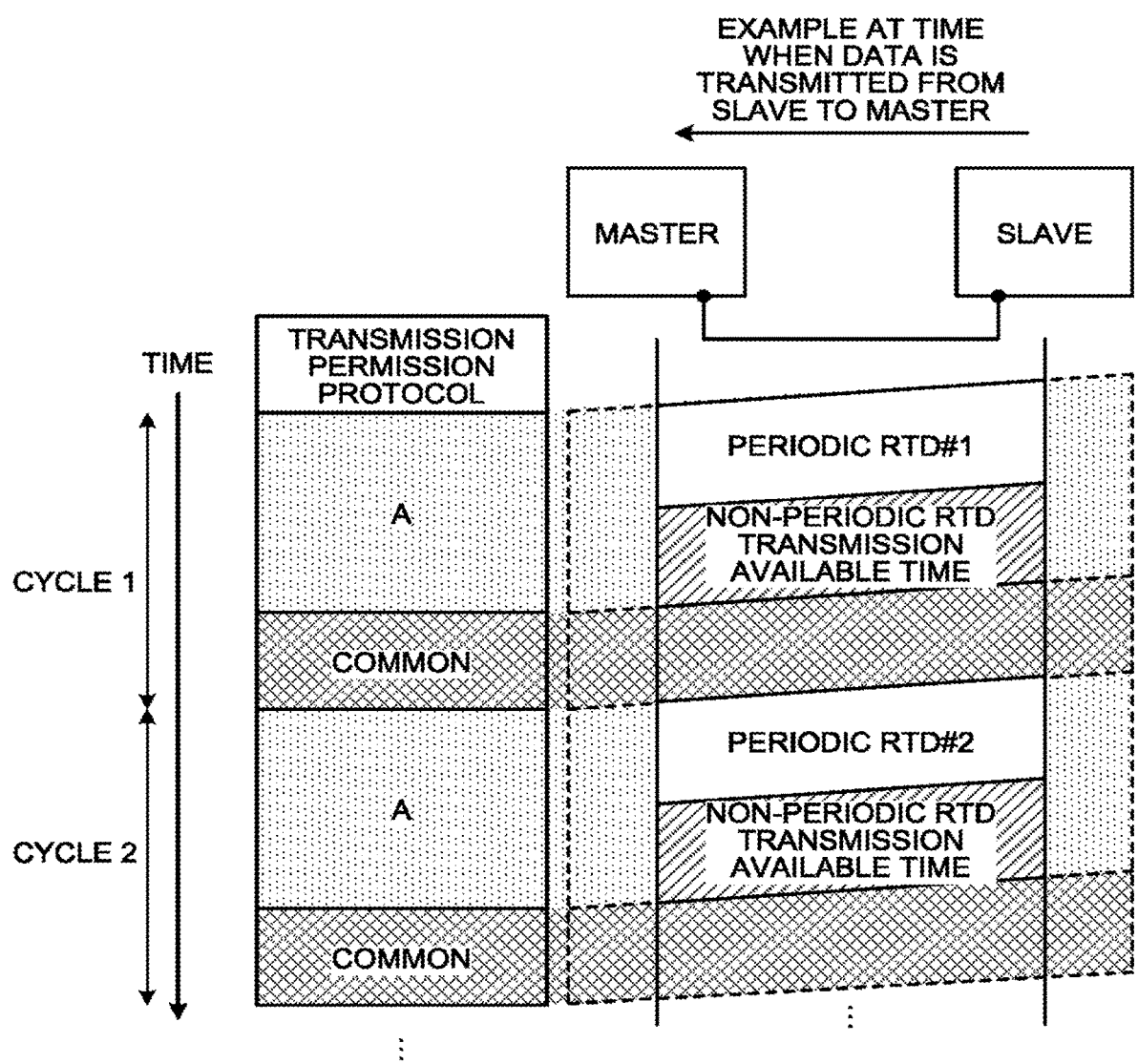
FIG. 16 is a diagram illustrating a sixth example of the data transmission operation according to the second embodiment.

FIG. 16 is a diagram illustrating a sixth example of the data transmission operation of the network system according to the second embodiment. Similarly to FIGS. 11 and 12, FIG. 16 illustrates an operation example in a case where the slave transmits data to the master in the network in which the period A and the common period are set, the period A being a transmission permission period in which the transmission by the communication device supporting the communication protocol A is permitted, the common period being a transmission permission period in which the transmission by all the communication devices is permitted regardless of the supported communication protocol.

Unlike the example illustrated in FIG. 11, in the example illustrated in FIG. 16, the period A and the common period set for the master do not completely coincide with the period A and the common period set for the slave, and the periods have values set in consideration of delay time on the transmission path from the slave to the master. When the delay time on the transmission path from the slave to the master is Td as some posit, start times of the period A and the common period of the slave are set to have values representing earlier point of time than start times of the period A and the common period of the master by Td, respectively. The slave transmits the periodic real-time data in each period A and transmits the non-periodic real-time data in the remaining partial time of the period A after the transmission of the periodic real-time data is completed. The slave transmits the other data which does not correspond to any of the periodic real-time data and the non-periodic real-time data in the common period.

In the example illustrated in FIG. 16, since the period A and the common period of the master are set to have values different from those of the period A and the common period of the slave, respectively, it is not necessary to determine the lengths of the period A and the common period in consideration of the delay time on the transmission path from the slave to the master. That is, the lengths of the period A and the common period can be set to be shorter than those in the example illustrated in FIG. 11.

Figure 17:
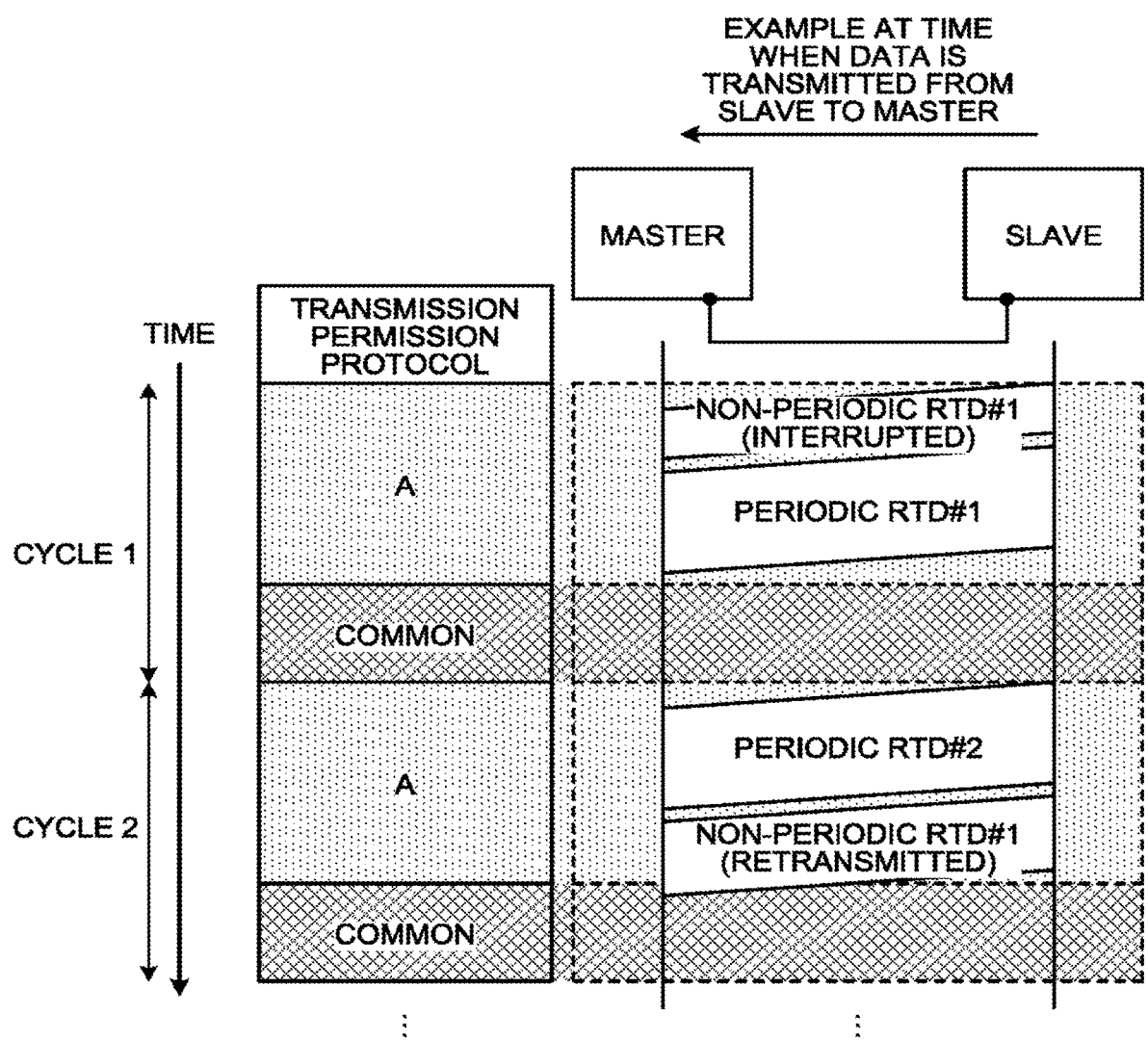
FIG. 17 is a diagram illustrating a seventh example of the data transmission operation according to the second embodiment.

FIG. 17 is a diagram illustrating a seventh example of the data transmission operation of the network system according to the second embodiment. Similarly to FIGS. 11 and 12, and the like, FIG. 17 illustrates an operation example in a case where the slave transmits data to the master in the network in which the period A and the common period are set, the period A being a transmission permission period in which the transmission by the communication device supporting the communication protocol A is permitted, the common period being a transmission permission period in which the transmission by all the communication devices is permitted regardless of the supported communication protocol.

In the example illustrated in FIG. 17, when the periodic real-time data #1 is generated during the transmission of the non-periodic real-time data #1 in the period A of the cycle 1, the slave interrupts the transmission of the non-periodic real-time data #1 and starts to transmit the periodic real-time data #1. Thereafter, after transmitting the periodic real-time data #2 in the period A of the next cycle 2, the slave retransmits the non-periodic real-time data #1 of which the transmission has been interrupted in the cycle 1. In the period A of the cycle 2, the slave transmits the non-periodic real-time data #1 again from the beginning thereof.

In the example illustrated in FIG. 17, when the periodic real-time data is generated during the transmission of the non-periodic real-time data, the transmission of the non-periodic real-time data is stopped, and the transmission of the periodic real-time data is started. Therefore, the periodic real-time data can be more preferentially transmitted than the non-periodic real-time data.

Figure 18:
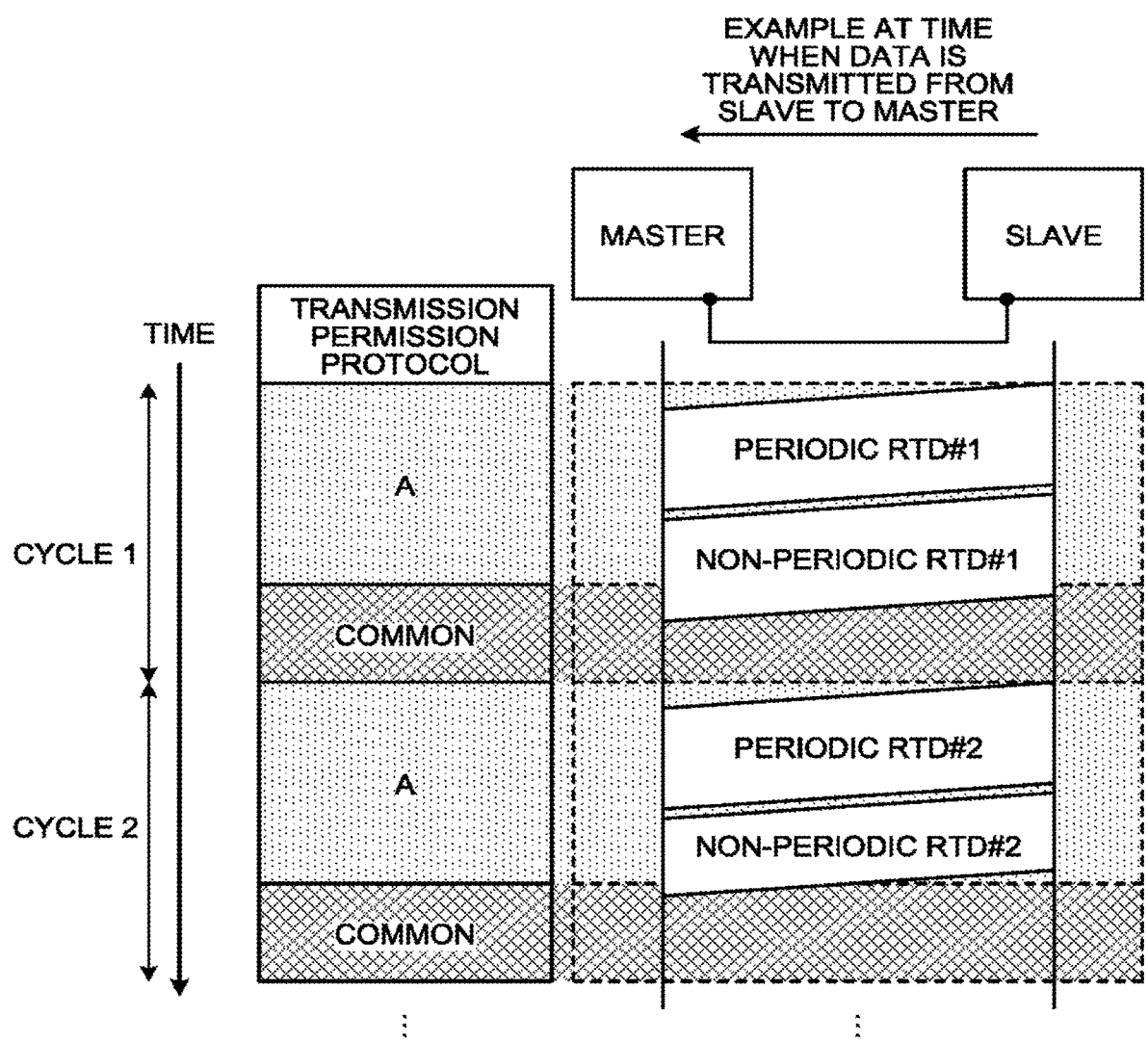
FIG. 18 is a diagram illustrating an eighth example of the data transmission operation according to the second embodiment.

FIG. 18 is a diagram illustrating an eighth example of the data transmission operation of the network system according to the second embodiment. Similarly to FIGS. 11 and 12, and the like, FIG. 18 illustrates an operation example in a case where the slave transmits data to the master in the network in which the period A and the common period are set, the period A being a transmission permission period in which the transmission by the communication device supporting the communication protocol A is permitted, the common period being a transmission permission period in which the transmission by all the communication devices is permitted regardless of the supported communication protocol.

In the first example illustrated in FIG. 11 and the like, the periodic real-time data and the non-periodic real-time data are transmitted in the period A in which the transmission of the periodic real-time data and the non-periodic real-time data is permitted. In contrast to this, in the example illustrated in FIG. 18, when the data cannot be completely transmitted in the period A, the data is continuously transmitted in both of the period A and the common period. In the example illustrated in FIG. 18, the transmission of the non-periodic real-time data #1 is not completed in the period A of the cycle 1, but a part of the data is transmitted in the common period.

According to the example illustrated in FIG. 18, in a case where a large volume of data which cannot be completely transmitted in the period A exists, it is possible to prevent the transmission delay time from becoming longer beyond necessity.

In each embodiment, a case has been described where network topology having communication devices connected by line is used as a specific example of the network system. However, this is an example, and the network according to each embodiment can be applied to other network topology.

Figure 19:
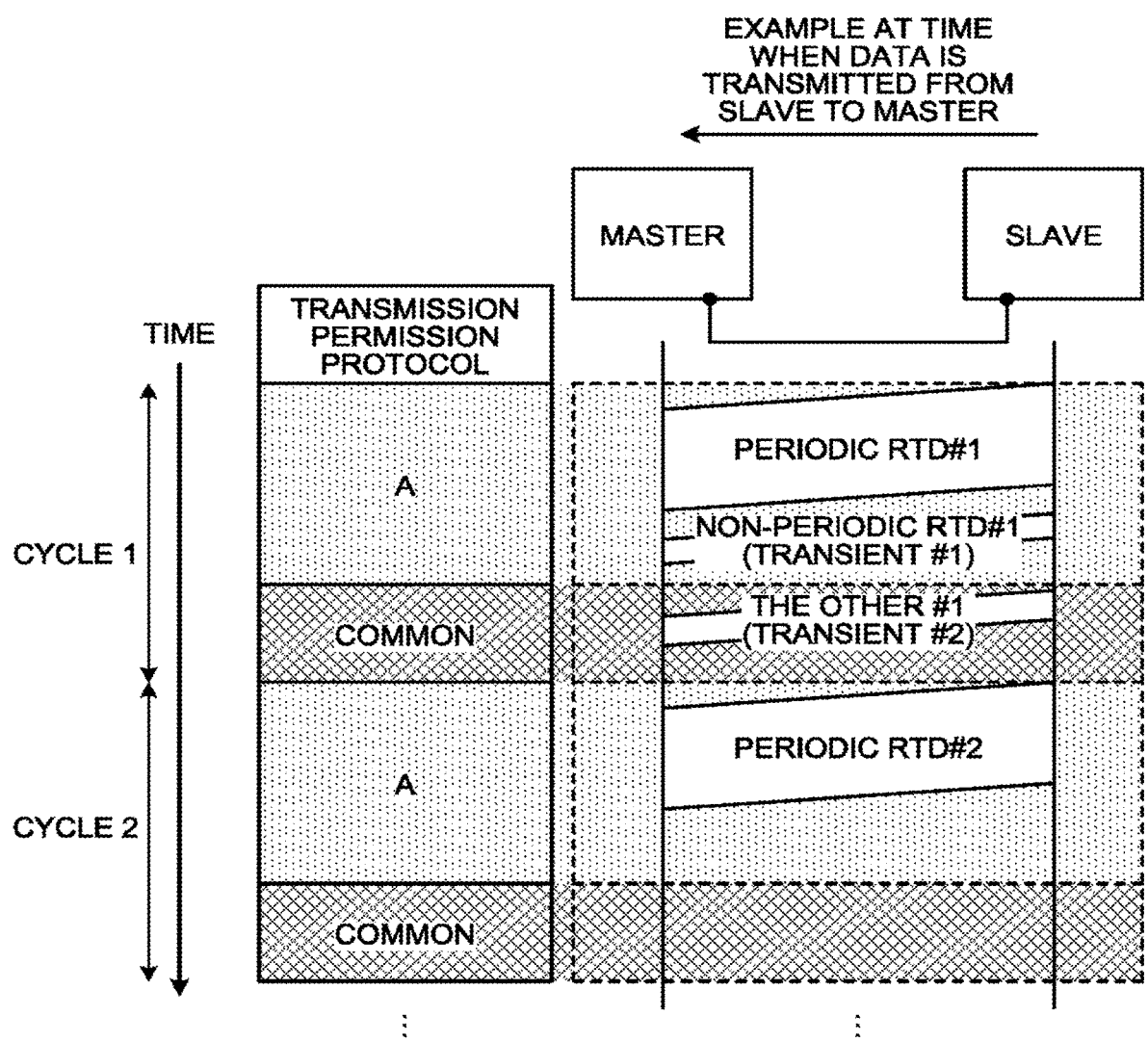
FIG. 19 is a diagram illustrating a ninth example of the data transmission operation according to the second embodiment.

FIG. 19 is a diagram illustrating a ninth example of the data transmission operation of the network system according to the second embodiment. Similarly to FIGS. 11 and 12, and the like, FIG. 19 illustrates an operation example in a case where the slave transmits data to the master in the network in which the period A and the common period are set, the period A being a transmission permission period in which the transmission by the communication device supporting the communication protocol A is permitted, the common period being a transmission permission period in which the transmission by all the communication devices is permitted regardless of the supported communication protocol.

In the example illustrated in FIG. 19, the slave transmits the periodic real-time data #1 and transmits transient data #1 as the non-periodic real-time data #1 in the period A of the cycle 1, and transmits transient data #2 as the other data #1 in the common period of the cycle 1. In addition, the slave transmits the periodic real-time data #2 in the period A of the cycle 2. The periodic real-time data #1 and #2 corresponds to the control data transmitted in the cyclic communication described above. The transient data #1 corresponds to transient data requiring the low delay transmission among the transient data described above. The transient data #2 corresponds to transient data which does not require the low delay transmission. In a case where the transient data which does not require the low delay transmission is generated in the period A, the slave transmits the transient data after waiting for the common period.

The slave may transmit the periodic real-time data #1 and the transient data #1 using a single communication frame.

According to the example illustrated in FIG. 19, since the transient data which does not require the low delay transmission is transmitted in the common period, the transmission of the transient data requiring the low delay transmission can be prevented from being delayed by an effect of the transmission operation of the transient data which does not require the low delay transmission.

The configurations described in the above embodiments represent exemplary contents of the present invention and can be combined with other publicly known techniques, and some thereof can be partially omitted and/or modified without departing from the scope of the present invention.

REFERENCE SIGNS LIST

1, 1A, 1B, 1C communication device; 11 clocking unit; 12 time synchronization unit; 13 transmission period setting unit; 14 communication processing unit; 20 processing circuit; 21 processor; 22 memory; 30 network controller; 41, 42 driver circuit; 51, 52 connector; 100 network system.

The invention claimed is:

1. A network system constituted by a communication device to perform communication according to a first communication protocol under which data requiring low delay transmission is periodically transmitted, a communication device to perform communication according to a second communication protocol under which data requiring low delay transmission is non-periodically transmitted, and a communication device to perform communication according to a third communication protocol under which data that does not require low delay transmission is non-periodically transmitted, wherein a first period in which transmission with a token control protocol that is the first communication protocol is permitted, a second period in which transmission with the second communication protocol is permitted, and a third period in which transmission with the third communication protocol is permitted are periodically allocated and a length of the first period, a length of the second period, and a length of the third period are equal to each other, and each of the communication devices transmits data in a period in which the transmission with the communication protocol supported by the communication device is permitted, and transfers data received from another communication device in a period in which transmission with a communication protocol supported by a communication device that is a data transmission source of the received data is permitted.

2. A network system constituted by a communication device to perform communication according to a first communication protocol under which data requiring low delay transmission is periodically transmitted, a communication device to perform communication according to a second communication protocol under which data requiring low delay transmission is non-periodically transmitted, and a communication device to perform communication according to a third communication protocol under which data that does not require low delay transmission is non-periodically transmitted wherein a first period in which the transmission with a token control protocol that is the first communication protocol is permitted, a second period in which the transmission with the second communication protocol is permitted, and a third period in which the transmission with the third communication protocol is permitted are periodically allocated, and at least one of a length of the first period, a length of the second period, and a length of the third period is different from the others, each of the communication devices transmits data in a period in which the transmission with the communication protocol supported by the communication device is permitted, and transfers data received from another communication device in a period in which transmission with a communication protocol supported by a communication device that is a data transmission source of the received data is permitted.

3. The network system according to claim 1, wherein a cycle in which the first period, the second period, and the third period are periodically allocated includes two or more periods each corresponding to at least one of the first period, the second period, and the third period.

4. The network system according to claim 1, wherein some or all of the communication devices supporting the token control protocol hold a token when a period different from the first period comes until a next first period comes, and restart transmission of the token in the next first period.

5. The network system according to claim 1, wherein a cycle in which the first period, the second period, and the third period are periodically allocated includes a common period in which transmission by all the communication devices is permitted regardless of the supported communication protocol.

6. The network system according to claim 1, wherein the third period is a common period in which transmission by all the communication devices is permitted regardless of the supported communication protocol.

7. The network system according to claim 5, wherein when receiving data, the communication devices confirm whether or not a current period is a period in which transmission of the received data is permitted, transfer the received data when the current period is the period in which the transmission is permitted, and transfer the received data after waiting for the common period when the current period is not the period in which the transmission is permitted.

8. A network system constituted by a communication device to perform communication according to a first communication protocol under which first data that is periodically transmitted and requires low delay transmission is transmitted, a communication device to perform communication according to a second communication protocol under which second data that is non-periodically transmitted and requires low delay transmission is transmitted, and a communication device to perform communication according to a third communication protocol under which other data that does not correspond to any of the first data and the second data is non-periodically transmitted, wherein a low delay transmission period in which the transmission with the first communication protocol and the transmission with the second communication protocol are permitted and a common period in which transmission with all the communication protocols is permitted are allocated, each of the communication devices transmits data in the period in which transmission with a communication protocol supported by the communication device is permitted, and transfers data received from another communication device in a period in which transmission with a communication protocol supported by a communication device that is a data transmission source is permitted, and setting of the low delay transmission period is different between a transmission-side communication device and a reception-side communication device in consideration of a delay time on a transmission path from the transmission-side communication device of the first data and the second data to the reception-side communication device of the first data and the second data.

9. The network system according to claim 8, wherein the second data is transient data requiring low delay transmission among transient data exchanged in control of an industrial machine.

10. A communication method in a network system in which a period in which transmission with a first communication protocol under which data requiring low delay transmission is periodically transmitted is permitted, a period in which communication with a second communication protocol under which data requiring low delay transmission is non-periodically transmitted is permitted, and a period in which communication with a third communication protocol under which data that does not require low delay transmission is non-periodically transmitted is permitted are allocated, wherein a first period in which transmission with a token control protocol that is the first communication protocol is permitted, a second period in which transmission with the second communication protocol is permitted, and a third period in which transmission with the third communication protocol is permitted are periodically allocated, and a length of the first period, a length of the second period, and a length of the third period are equal to each other, each of communication devices transmits data in a period in which transmission with a communication protocol supported by the communication device is permitted, and transfers the data received from another communication device in a period in which transmission with a communication protocol supported by a communication device that is a data transmission source is permitted.

11. A communication method in a network system in which a period in which transmission with a first communication protocol under which data requiring low delay transmission is periodically transmitted is permitted, a period in which communication with a second communication protocol under which data requiring low delay transmission is non-periodically transmitted is permitted, and a period in which communication with a third communication protocol under which data that does not require low delay transmission is non-periodically transmitted is permitted are allocated, wherein a first period in which the transmission with a token control protocol that is the first communication protocol is permitted, a second period in which the transmission with the second communication protocol is permitted, and a third period in which the transmission with the third communication protocol is permitted are periodically allocated, and at least one of a length of the first period, a length of the second period, and a length of the third period is different from the others, and each of the communication devices transmits data in a period in which transmission with a communication protocol supported by the communication device is permitted, and transfers the data received from another communication device in a period in which transmission with a communication protocol supported by a communication device that is a data transmission source is permitted.

12. The communication method according to claim 10, wherein a cycle in which the first period, the second period, and the third period are periodically allocated includes two or more periods each corresponding to at least one of the first period, the second period, and the third period.

13. The communication method according to claim 10, wherein
some or all of the communication devices supporting the token control protocol hold a token in a period different from the first period until a next first period comes, and restart transmission of the token in the next first period.

14. The communication method according to claim 10, wherein a cycle in which the first period, the second period, and the third period are periodically allocated includes a common period in which transmission by all the communication devices is permitted regardless of the supported communication protocol.

15. The communication method according to claim 10, wherein the third period is a common period in which transmission by all the communication devices is permitted regardless of the supported communication protocol.

16. The communication method according to claim 14, wherein when receiving data, the communication devices confirm whether or not a current period is a period in which transmission of the received data is permitted, transfer the received data when the current period is the period in which the transmission is permitted, and transfer the received data after waiting for the common period when the current period is not the period in which the transmission is permitted.

17. A communication method in a network system in which a low delay transmission period in which transmission of first data that is periodically transmitted and requires low delay transmission and transmission of second data that is non-periodically transmitted and requires low delay transmission are permitted and a common period in which non-periodical transmission of other data that does not correspond to any of the first data and the second data is permitted are allocated, wherein setting of the low delay transmission period is different between a transmission-side communication device and a reception-side communication device in consideration of a length of delay time on a transmission path from the transmission-side communication device of the first data and the second data to the reception-side communication device of the first data and the second data, and each of two or more communication devices transmits data in a period in which the transmission with a communication protocol supported by the communication device is permitted, and transfers the data received from another communication device in a period in which transmission with a communication protocol supported by a communication device that is a data transmission source is permitted.

18. The communication method according to claim 17, wherein the second data is transient data requiring low delay transmission among transient data exchanged in control of an industrial machine.

* * * * *